(12) United States Patent
Omoto et al.

(10) Patent No.: US 10,190,576 B2
(45) Date of Patent: Jan. 29, 2019

(54) ROLLER BEARING, RETAINER SEGMENT, SPACER AND MAIN SHAFT SUPPORT STRUCTURE OF WIND-POWER GENERATOR

(71) Applicant: NTN CORPORATION, Osaka (JP)

(72) Inventors: Tatsuya Omoto, Suzuka (JP); Shoichi Hioki, Ageo (JP); Mitsuo Sasabe, Kuwana (JP); Eiichi Nakamizo, Kunitachi (JP); Tomoya Sakaguchi, Kuwana (JP)

(73) Assignee: NTN CORPORATION, Osaka (JP)

( * ) Notice: Subject to any disclaimer, the term of this patent is extended or adjusted under 35 U.S.C. 154(b) by 0 days.

(21) Appl. No.: 15/642,491

(22) Filed: Jul. 6, 2017

(65) Prior Publication Data

US 2017/0306929 A1    Oct. 26, 2017

Related U.S. Application Data

(62) Division of application No. 14/533,217, filed on Nov. 5, 2014, now Pat. No. 9,732,734, which is a division (Continued)

(30) Foreign Application Priority Data

Mar. 10, 2006 (JP) .................................. 2006-066175
Mar. 10, 2006 (JP) .................................. 2006-066176
Mar. 13, 2006 (JP) .................................. 2006-068294

(51) Int. Cl.
*F16C 33/51* (2006.01)
*F16C 33/46* (2006.01)
(Continued)

(52) U.S. Cl.
CPC ............. *F03D 15/00* (2016.05); *F03D 80/70* (2016.05); *F16C 25/06* (2013.01); *F16C 33/37* (2013.01);
(Continued)

(58) Field of Classification Search
CPC ........ F16C 19/364; F16C 25/06; F16C 33/37; F16C 33/467; F16C 33/541; F16C 33/513;
(Continued)

(56) References Cited

U.S. PATENT DOCUMENTS 821,882 A * 5/1906 Perkins .................... F16C 19/40
384/553
1,125,316 A * 1/1915 Heinzelman ........ F16C 33/4629
384/573
(Continued)

FOREIGN PATENT DOCUMENTS

CN    1427149    7/2003
DE    7432281    1/1975
(Continued)

*Primary Examiner* — Marcus Charles
(74) *Attorney, Agent, or Firm* — Clark & Brody

(57) ABSTRACT

A roller bearing comprises an outer ring, an inner ring, a plurality of rollers arranged between said outer ring and said inner ring; and a plurality of retainer segments having a plurality of column parts extending in a direction along a shaft so as to form a pocket for holding said roller. A connection part extends in a circumferential direction so as to connect the plurality of column parts, and continuously lined with each other in the circumferential direction between said outer ring and said inner ring, in which a corner of a circumferential end face is chamfered. Also provided is a spacer arranged between the circumferentially arranged first retainer segment and last retainer segment, wherein a chamfered part is provided at a corner of a circumferential spacer end face of the space. The roller bearing can be used in a main shaft support structure of a wind-power generator.

6 Claims, 17 Drawing Sheets

Related U.S. Application Data of application No. 13/683,329, filed on Nov. 21, 2012, now Pat. No. 8,905,646, which is a division of application No. 12/224,844, filed as application No. PCT/JP2007/053546 on Feb. 26, 2007.

(51) Int. Cl.

| | | |
|---|---|---|
| *F03D 15/00* | (2016.01) | |
| *F16C 25/06* | (2006.01) | |
| *F03D 80/70* | (2016.01) | |
| *F16C 33/37* | (2006.01) | |
| *F16C 33/54* | (2006.01) | |
| *F16C 19/36* | (2006.01) | |

(52) U.S. Cl.
CPC ........ *F16C 33/467* (2013.01); *F16C 33/4694* (2013.01); *F16C 33/513* (2013.01); *F16C 33/541* (2013.01); *F16C 19/364* (2013.01); *F16C 2300/14* (2013.01); *F16C 2360/31* (2013.01); *Y02E 10/722* (2013.01)

(58) Field of Classification Search
CPC .............. F16C 2300/14; F16C 2360/31; F16C 33/4694; F03D 11/008; F03D 80/70; F03D 9/00; Y02E 10/722; F05B 2260/74
USPC ....... 384/470, 548, 551, 572, 577–578, 580, 384/623; 416/174
See application file for complete search history.

(56) References Cited

U.S. PATENT DOCUMENTS

| | | | |
|---|---|---|---|
| 1,966,266 A * | 7/1934 | Skelly | F16C 33/4682 384/573 |
| 2,472,728 A | 6/1949 | Sanders | |
| 2,648,902 A | 8/1953 | Petersen | |
| 2,688,285 A | 9/1954 | Stockett, Jr. | |
| 2,705,176 A | 3/1955 | Palmgren | |
| 3,431,037 A | 3/1969 | Benson | |
| 3,494,684 A | 2/1970 | Benson | |
| 3,501,212 A | 3/1970 | Husten | |
| 3,547,504 A | 12/1970 | Cedler et al. | |
| 3,628,839 A * | 12/1971 | Vannest | F16C 33/4623 384/470 |
| 3,938,866 A | 2/1976 | Martin | |
| 3,966,284 A * | 6/1976 | Martin | F16C 19/10 384/623 |
| 4,222,620 A | 9/1980 | Mirring | |
| 4,588,313 A * | 5/1986 | Knappe | F16C 33/3818 384/520 |
| 4,629,339 A | 12/1986 | Morinaga | |
| 4,881,830 A * | 11/1989 | Shepard | F16C 9/04 384/523 |
| 5,033,878 A | 7/1991 | Tsuji et al. | |
| 5,140,856 A | 8/1992 | Larsen | |
| 5,295,749 A | 3/1994 | Takahashi | |
| 5,772,338 A | 6/1998 | Hillmann et al. | |
| 5,803,620 A | 9/1998 | Yokota | |
| 5,816,713 A | 10/1998 | Prock et al. | |
| 6,196,728 B1 | 3/2001 | Wahler et al. | |
| 6,361,275 B1 | 3/2002 | Wobben | |
| 6,513,987 B2 | 2/2003 | Takahashi et al. | |
| 6,767,135 B2 | 7/2004 | Yokota | |
| 7,004,724 B2 | 2/2006 | Pierce | |
| 7,160,083 B2 | 1/2007 | Pierce | |
| 2002/0085783 A1 | 7/2002 | Yokota | |
| 2003/0012469 A1 | 1/2003 | Dittenhofer | |
| 2005/0094913 A1 | 5/2005 | Kackowski | |
| 2005/0175264 A1 * | 8/2005 | Kim | F16C 29/0685 384/51 |

FOREIGN PATENT DOCUMENTS

| | | | |
|---|---|---|---|
| DE | 24 55 291 | 5/1976 | |
| DE | 3115780 A * | 11/1982 | .............. F16C 33/38 |
| DE | 3130585 A * | 2/1983 | .............. F03D 11/04 |
| DE | 3246348 A1 * | 6/1984 | .............. F16C 19/30 |
| DE | 3627153 C * | 12/1987 | .............. F16C 33/46 |
| DE | 8621532 | 12/1987 | |
| DE | 19644705 A * | 4/1988 | .............. F03D 7/02 |
| DE | 4221783 A1 * | 1/1994 | ............ F03D 7/0224 |
| DE | 19641972 | 4/1998 | |
| DE | 203 18 163 | 3/2004 | |
| DE | 10302002 | 7/2004 | |
| DE | 10 2005 009980 | 6/2006 | |
| DE | 10 2011 085356 | 5/2013 | |
| EP | 1 408 248 | 4/2004 | |
| EP | 1783363 A1 * | 9/2007 | .............. F03D 11/02 |
| FR | 1559419 | 3/1969 | |
| GB | 961203 | 6/1964 | |
| GB | 2099089 A * | 12/1982 | .............. F16C 19/362 |
| GB | 2104600 A * | 3/1983 | .............. F16C 33/50 |
| JP | 50-94349 | 7/1975 | |
| JP | 53-23846 | 2/1978 | |
| JP | 54-15145 | 1/1979 | |
| JP | 61-33298 | 9/1986 | |
| JP | 2-141724 | 11/1990 | |
| JP | 2000-297816 | 10/2000 | |
| JP | 2001-132746 | 5/2001 | |
| JP | 2002-195270 | 7/2002 | |
| JP | 2002-339979 | 11/2002 | |
| JP | 2003-343573 | 12/2003 | |
| JP | 2004-132473 | 4/2004 | |
| JP | 2004-353808 | 12/2004 | |
| JP | 2005-147331 | 6/2005 | |
| JP | 2006-138379 | 6/2006 | |
| SU | 796511 | 1/1981 | |
| WO | 00/55382 | 9/2000 | |
| WO | 2010/005007 | 1/2010 | |
| WO | 2011/077831 | 6/2011 | |

\* cited by examiner

PRIOR ART

PRIOR ART

ROLLER BEARING, RETAINER SEGMENT, SPACER AND MAIN SHAFT SUPPORT STRUCTURE OF WIND-POWER GENERATOR

CROSS REFERENCE TO RELATED APPLICATIONS

This application is a Divisional of U.S. Ser. No. 14/533,217, filed on Nov. 5, 2014, which is a Divisional of U.S. Ser. No. 13/683,329, filed on Nov. 21, 2012, which is a Divisional of U.S. Ser. No. 12/224,844 filed on Sep. 8, 2008, which is a national phase of PCT/JP2007/053546 filed on Feb. 26, 2007, which is published as WO/2007/105476 on Sep. 20, 2007.

TECHNICAL FIELD

The present invention relates to a roller bearing, a retainer segment, a spacer and a main shaft structure of a wind-power generator, and more particularly to a large roller bearing, a retainer segment and a spacer contained in the large roller bearing, and a main shaft structure of a wind-power generator comprising the large roller bearing.

BACKGROUND ART

A roller bearing comprises an outer ring, an inner ring, a plurality of rollers arranged between the outer ring and the inner ring, and a retainer retaining the plurality of rollers in general. The retainer retaining the rollers includes various kinds of retainers such as a resin retainer, a pressed retainer, a machined retainer, and a welded retainer based on a difference in material and production method, and they are used depending on their usage and characteristics. In addition, the retainer is an integrated type, that is, it comprises annular one component in general.

According to a roller bearing for supporting a main shaft of a wind-power generator provided with a blade for receiving the wind, since it needs to receive a high load, the roller bearing becomes also large. It means that each component member constituting the roller bearing such as a roller and a retainer becomes large, so that it becomes difficult to produce and assemble the member. In this case, when each member can be split, its production and assembling become easy.

Here, a technique regarding a split type retainer in which a retainer contained in the roller bearing is split along a split line extending in a direction along a shaft has been disclosed in European Patent Publication No. 1408248A2. FIG. 36 is a perspective view showing a retainer segment of the split type retainer disclosed in the European Patent Publication No. 1408248A2. Referring to FIG. 36, a retainer segment 101a has column parts 103a, 103b, 103c, 108d and 103e extending in a direction along a shaft so as to form a plurality of pockets 104 to hold rollers, and connection parts 102a and 102b extending in a circumferential direction so as to connect the plurality of column parts 103a to 103e.

FIG. 37 is a sectional view showing a part of the roller bearing containing the retainer segment 101a shown in FIG. 36. Referring to FIGS. 36 and 37, a description will be made of the constitution of a roller bearing 111 containing the retainer segment 101a. The roller bearing 111 has an outer ring 112, an inner ring 113, a plurality of rollers 114, and the plurality of retainer segments 101a, 101b, 101c and the like. The plurality of rollers 114 are held by the plurality of retainer segments 101a and the like in the vicinity of a PCD (Pitch Circle Diameter) in which the rollers roll most stably. The retainer segment 101a holding the plurality of rollers 114 is arranged circumferentially so as to abut on the adjacent retainer segments 101b and 101c having the same configuration at its column parts 103a and 103e positioned on the circumferentially most outer side. The plurality of retainer segments 101a, 101b, 101c and the like are continuously lined with each other and incorporated in the roller bearing 111, whereby one annular retainer contained in the roller bearing 111 is formed.

The above one annular retainer is formed by lining the plurality of retainer segments continuously in the circumferential direction. When the one annular retainer is formed by lining the plurality of retainer segments in the circumferential direction, a circumferential gap in view of thermal expansion and the like is needed.

When the gap exists between the retainer segments after the roller bearing is assembled, the adjacent retainer segments collide against each other in the circumferential direction when the roller bearing is operated. In this case, the column part positioned at the end receives the circumferential load from the adjacent retainer segment and it is deformed.

This will be described with reference to FIGS. 36, 37 and 38. FIG. 38 is a view showing the vicinity of the column part 103a positioned at one end of the retainer segment 101a incorporated in the roller bearing, taken from the radial outer side, that is, from a direction shown by an arrow X in FIG. 37. In addition, the deformation of the column part 103a is shown with exaggeration in FIG. 38. Referring to FIGS. 36, 37 and 38, the retainer segment 101a receives the load from the circumferential direction, that is, from the direction shown by arrows Y in FIGS. 37 and 38 due to the collision against the adjacent retainer segment 101b.

Here, the load from the retainer segment 101b is applied to the column part 103a positioned at the circumferential end in the retainer segment 101a. Since the column part 103a is not connected in the circumferential direction and vulnerable to the circumferential load, it is deformed to the side of the pocket 104. In this case, the circumferential inner side of the column part 103a, that is, an end face 109 of the pocket 104 enters the pocket 104. As a result, the roller could be locked and the retainer segment 101 could be damaged due to the abrasion of the column part 103a.

DISCLOSURE OF THE INVENTION

It is an object of the present invention to provide a roller bearing in which rollers can roll appropriately and a retainer segment is hardly damaged.

It is another object of the present invention to provide a retainer segment in which rollers can roll appropriately and a retainer segment is hardly damaged.

It is still another object of the present invention to provide a main shaft structure of a wind-power generator having a long life.

It is still another object of the present invention to provide a roller bearing in which a retainer segment is hardly damaged.

It is still another object of the present invention to provide a retainer segment that is hardly damaged.

It is still another object of the present invention to provide a spacer that can prevent a retainer segment from being damaged.

A roller bearing according to the present invention comprises an outer ring, an inner ring, a plurality of rollers arranged between the outer ring and the inner ring, and a plurality of retainer segments having a plurality of column parts extending in a direction along a shaft so as to form a pocket for holding the roller, and a connection part extending in a circumferential direction so as to connect the plurality of column parts, and continuously lined with each other in the circumferential direction between the outer ring and the inner ring. The column part is positioned at circumferential each end of the retainer segment. Here, a circumferential outer side end face of the column part positioned at each end is flat, and a circumferential inner side end face of the column part positioned at the end is provided with a recess recessed in the circumferential direction so as to reduce the thickness of the column part.

In the case where a load is applied from the adjacent retainer segment in the circumferential direction, when the column part positioned at each end is flat, the load is applied to the column part. However, in this case, the recess provided so as to reduce the thickness in the column part positioned at the end is first to be bent to the circumferential inner side, that is, toward the pocket. When the recess is bent to some extent, the load applied from the adjacent retainer segment is applied to the connection part positioned at each end of the column part. Since the connection parts are continuously lined in the circumferential direction, it is resistant to the circumferential load and it can receive a high load. Since the recess is provided in the circumferential inner side end face, even when it is deformed toward the pocket, the rolling of the roller is not affected, so that the roller can be prevented from being locked. In addition, the column part is prevented from being damaged due to the contact with the roller. Therefore, the roller can roll appropriately, and the retainer segment can be prevented from being damaged.

Here, the retainer segment is a single body provided by splitting one annular retainer along the split line extending in the direction along the shaft so as to have at least one pocket for holding the roller. The plurality of retainer segments is continuously lined with each other in the circumferential direction to be incorporated in the roller bearing, whereby the one annular retainer is formed.

Preferably, the recess has a roughly arc configuration. According to this constitution, since the recess does not contain a corner part, a crack starting from the corner part due to the load applied from the circumferential direction can be prevented from being generated. Therefore, the column part of the retainer segment can be further prevented from being damaged.

Still preferably, the recess is provided in the column part positioned at each end. Thus, since the retainer segments are arranged to assemble the roller bearing without concerning about directionality, the productivity of the roller bearing can be improved.

Still preferably, the column part having the recess is provided with a guide surface formed at a position in which the recess is not provided. Thus, the retainer segment can be guided at a part of the column part unaffected by the deformation of the recess. Therefore, the arrangement of the retainer segment can be stable in the radial direction.

Further preferably, a spacer is arranged between the circumferentially arranged first retainer segment and last retainer segment.

As described above, when the one annular retainer is formed by lining the plurality of retainer segments continuously with each other in the circumferential direction, the gap within an appropriate range is needed in the circumferential direction in view of the thermal expansion and the like. However, since each retainer segment is produced independently, each retainer segment has circumferential dimensional deviation. When such retainer segments are continuously lined with each other in the circumferential direction, the dimensional deviation are also accumulated. In order to limit the gap dimension to a predetermined range, each retainer segment has to be produced with high accuracy.

Here, it is not necessary to produce each retainer segment with high accuracy by providing the spacer for adjusting the gap between the adjacent retainer segments when the circumferential gap dimension is adjusted, so that the productivity of the retainer segment is improved. Accordingly, the productivity of the roller bearing is improved.

In addition, the first retainer segment is the retainer segment arranged first when the retainer segments are continuously lined with each other in the circumferential direction and the last retainer segment is the retainer segment arranged last when the retainer segments are continuously arranged so as to abut on the adjacent retainer segment. After the retainer segments are arranged as described above, the gap generated between the first retainer segment and the last retainer segment is adjusted so as to have an appropriate gap dimension with the spacer. The spacer does not have a pocket for holding the roller, so that it is different from the retainer segment having at least one pocket for holding the roller.

According to another aspect of the present invention, a retainer segment is provided by splitting one annular retainer along a split line extending in a direction along a shaft so as to have at least one pocket for housing a roller. In addition, the retainer segment has a plurality of column parts extending in the direction along the shaft so as to form the pocket for holding the roller, and a connection part extending in a circumferential direction so as to connect the plurality of column parts. The column part is positioned at circumferential each end of the retainer segment. Here, a circumferential outer side end face of the column part positioned at each end is flat, and a circumferential inner side end face of the column part positioned at the end is provided with a recess recessed in the circumferential direction so as to reduce the thickness of the column part.

According to the above retainer segment, even when the circumferential load is applied from the adjacent retainer segment thereto, the roller can be prevented from being locked and the column part can be prevented from being abraded and the retainer segment is prevented form being damaged.

According to still another aspect of the present invention, a main shaft support structure of a wind-power generator comprises a blade receiving wind power, a main shaft having one end fixed to the blade and rotating together with the blade, and a roller bearing incorporated in a fixing member and supporting the main shaft rotatably. The roller bearing comprises an outer ring, an inner ring, a plurality of rollers arranged between the outer ring and the inner ring, and a plurality of retainer segments having a plurality of column parts extending in a direction along the shaft so as to form a pocket for holding the roller, and a connection part extending in a circumferential direction so as to connect the plurality of column parts, and continuously lined with each other in the circumferential direction between the outer ring and the inner ring. The column part is positioned at circumferential each end of the retainer segment. Here, a circumferential outer side end face of the column part positioned at each end is flat, and a circumferential inner side end face of the column part positioned at the end is provided with a recess recessed in the circumferential direction so as to reduce the thickness of the column part.

Since the above main shaft structure of the wind-power generator contains the roller bearing in which the roller can roll appropriately and the retainer segment is hardly damaged, it can implement a long life.

According to the present invention, in the case where a load is applied from the adjacent retainer segment in the circumferential direction, when the column part positioned at each end is flat, the load is applied to the column part. However, in this case, the recess provided so as to reduce the thickness in the column part positioned at the end is first to be bent to the circumferential inner side, that is, toward the pocket. When the recess is bent to some extent, the load applied from the adjacent retainer segment is applied to the connection part positioned at each end of the column part. Since the connection parts are continuously lined in the circumferential direction, it is resistant to the circumferential load and it can receive a high load. Since the recess is provided in the circumferential inner side end face, even when it is deformed toward the pocket, the rolling of the roller is not affected, so that the roller can be prevented from being locked. In addition, the column part is prevented from being damaged due to the contact with the roller. Therefore, the roller can roll appropriately, and the retainer segment can be prevented from being damaged.

In addition, according to the above retainer segment, even when the circumferential load is applied from the adjacent retainer segment thereto, the roller can be prevented from being locked and the column part can be prevented from being abraded and the retainer segment is prevented from being damaged.

Since the above main shaft structure of the wind-power generator contains the roller bearing in which the roller can roll appropriately and the retainer segment is hardly damaged, it can implement a long life.

According to still another aspect of the present invention, a roller bearing comprises an outer ring, an inner ring, a plurality of rollers arranged between the outer ring and the inner ring, and a plurality of retainer segments having a plurality of column parts extending in a direction along a shaft so as to form a pocket for holding the roller, and a connection part extending in a circumferential direction so as to connect the plurality of column parts, and continuously lined with each other in the circumferential direction between the outer ring and the inner ring. The column part is positioned at circumferential each end of the retainer segment, a circumferential outer side of the column part positioned at the end is provided with an expansion part expanding in a circumferential direction and a circumferential inner side thereof is provided with a recess recessed in the circumferential direction.

According to the above constitution, the expansion part provided on the circumferential outer side of the column part positioned at the end in the retainer segment abuts on the adjacent retainer segment. Thus, the load applied from the adjacent retainer segment in the circumferential direction is applied to the expansion part first. Since the circumferential inner side of the column part is provided with the recess, the load applied to the expansion part is transmitted to the connection part along the configuration of the column part. Therefore, the column part is prevented from being deformed and the roller is prevented from being locked and the column part is prevented from being abraded. Since the connection parts are continuously lined in the circumferential direction, it is resistant to the load in the circumferential direction and can receive a high load. As a result, the retainer segment can be prevented from being damaged.

Preferably, the expansion part has a roughly arc configuration. Thus, since the load applied from the adjacent retainer segment is received at the roughly arc shaped part, the load can be transmitted to the connection part while the column part is further prevented from being deformed.

Still preferably, the recess has substantially the same configuration as that of the expansion part. Thus, the load can be transmitted to the connection part along the configuration of the column part more effectively. Here, the term "substantially the same configuration" means that when the expansion part has an arc configuration, the recess has also the arc configuration and when the expansion part comprises a plurality of flat surfaces, the recess also comprises a plurality of flat surfaces.

Still preferably, the expansion part and the recess are provided at the column part positioned at each end. Thus, since the retainer segments can be arranged to assemble the roller bearing without concerning about directionality, the productivity of the roller bearing is improved.

Still preferably, the column part having the expansion part and the recess is provided with a guide surface formed at a position in which the recess is not provided. Thus, since the retainer segment can be guided at a part of the column part unaffected by the deformation of the recess, the retainer segment can be stably guided.

Still preferably, a spacer arranged between the circumferentially arranged first retainer segment and last retainer segment is provided.

As described above, when the one annular retainer is formed by lining the plurality of retainer segments in the circumferential direction, the gap within an appropriate range is needed in the circumferential direction in view of the thermal expansion and the like. However, since each retainer segment is produced independently, each retainer segment has circumferential dimensional deviation. When such retainer segments are continuously lined with each other in the circumferential direction, the dimensional deviation are also accumulated. In order to limit the gap dimension to a predetermined range, each retainer segment has to be produced with high accuracy.

Here, it is not necessary to produce each retainer segment with high accuracy by providing the spacer for adjusting the gap between the adjacent retainer segments when the circumferential gap dimension is adjusted, so that the productivity of the retainer segment is improved. Accordingly, the productivity of the roller bearing is improved.

According to still another aspect of the present invention, a retainer segment is provided by splitting one annular retainer along a split line extending in a direction along a shaft so as to have at least one pocket for housing a roller. In addition, the retainer segment has a plurality of column parts extending in the direction along the shaft so as to form the pocket for holding the roller, and a connection part extending in a circumferential direction so as to connect the plurality of column parts. The column part is positioned at circumferential each end of the retainer segment. Here, a circumferential outer side of the column part positioned at the end is provided with an expansion part expanding in the circumferential direction and a circumferential inner side thereof is provided with a recess recessed in the circumferential direction.

According to the above retainer segment, since the circumferential load can be transmitted along the configuration of the column part while the column part is prevented from being deformed, the roller can be prevented from being locked and the retainer segment is prevented from being damaged.

According to still another aspect of the present invention, a main shaft support structure of a wind-power generator comprises a blade receiving wind power, a main shaft having one end fixed to the blade and rotating together with the blade, and a roller bearing incorporated in a fixing member and supporting the main shaft rotatably. The roller bearing comprises an outer ring, an inner ring, a plurality of rollers arranged between the outer ring and the inner ring, and a plurality of retainer segments having a plurality of column parts extending in a direction along the shaft so as to form a pocket for holding the roller, and a connection part extending in a circumferential direction so as to connect the plurality of column parts, and continuously lined with each other in the circumferential direction between the outer ring and the inner ring. The column part is positioned at circumferential each end of the retainer segment. Here, a circumferential outer side of the column part positioned at the end is provided with an expansion part expanding in a circumferential direction and a circumferential inner side thereof is provided with a recess recessed in the circumferential direction.

Since the above main shaft structure of the wind-power generator contains the roller bearing in which the roller can roll appropriately and the retainer segment is hardly damaged, it can implement a long life.

According to the present invention, the expansion part provided on the circumferential outer side of the column part positioned at the end in the retainer segment abuts on the adjacent retainer segment. Thus, the load applied from the adjacent retainer segment in the circumferential direction is applied to the expansion part first. Since the circumferential inner side of the column part is provided with the recess, the load applied to the expansion part is transmitted to the connection part along the configuration of the column part. Therefore, the column part is prevented from being deformed and the roller is prevented from being locked and the column part is prevented from being abraded. Since the connection parts are continuously lined in the circumferential direction, it is resistant to the load in the circumferential direction and can receive a high load. As a result, the retainer segment can be prevented from being damaged.

According to the above retainer segment, since the circumferential load can be transmitted to the connection part along the configuration of the column part while the column part is prevented from being deformed, the roller can be prevented from being locked and the retainer segment is prevented from being damaged.

Since the above main shaft structure of the wind-power generator contains the roller bearing in which the roller can roll appropriately and the retainer segment is hardly damaged, it can implement a long life.

According to still another aspect of the present invention, a roller bearing comprises an outer ring, an inner ring, a plurality of rollers arranged between the outer ring and the inner ring, and a plurality of retainer segments having a plurality of column parts extending in a direction along a shaft so as to form a pocket for holding the roller, and a connection part extending in a circumferential direction so as to connect the plurality of column parts, and continuously lined with each other in the circumferential direction between the outer ring and the inner ring, in which a corner of a circumferential end face is chamfered.

According to the above constitution, even when the retainer segment is inclined in the radial direction or the axial direction in the roller bearing, since the corner of the circumferential end face is chamfered, the retainer segment is prevented from hitting against an edge. Thus, the contact surface pressure with the adjacent retainer segment can be lowered and the friction and abrasion between them can be reduced. Therefore, the retainer segment is hardly damaged.

Preferably, the chamfered part is provided at a radial corner of the end face. According to the above constitution, when the retainer segment is inclined in the radial direction especially, the adjacent retainer segment can be prevented from hitting against an edge of the radial corner.

Preferably, the end face expands in the circumferential direction from the corner to the center. According to the above constitution, even when the retainer segment is inclined, the expansion part in the center of the circumferential end face comes in contact with the adjacent retainer segment. Thus, the contact surface pressure with the adjacent retainer segment can be further lowered and the friction and the abrasion between them can be further reduced.

Still preferably, the end face is provided with a crowning. Thus, since the part provided with the crowning in the retainer segment abuts on the adjacent retainer segment, the contact surface pressure with the adjacent retainer segment can be further lowered and the friction and the abrasion between them can be further reduced.

Still preferably, a spacer arranged between the circumferentially arranged first retainer segment and last retainer segment and having a chamfered part at a corner of a circumferential spacer end face is provided.

When the gap dimension provided in the circumferential direction is adjusted, the spacer for adjusting the gap is arranged in some cases. Since the spacer is an independent member, when it is inclined in the radial direction or the axial direction and comes in contact with the adjacent retainer segment at the corner of the circumferential spacer end face, it could hit against an edge. However, in the case where the spacer is provided with the chamfered part at the corner of the circumferential spacer end face, even when the spacer is inclined, it can be prevented from hitting against the edge at the circumferential corner of the spacer. Thus, the contact surface pressure with the adjacent retainer segment can be reduced and the friction and abrasion between them can be reduced.

According to still another aspect of the present invention, a retainer segment is provided by splitting one annular retainer along a split line extending in a direction along a shaft so as to have at least one pocket for housing a roller. In addition, the retainer segment has a plurality of column parts extending in the direction along the shaft so as to form the pocket for holding the roller, and a connection part extending in a circumferential direction so as to connect the plurality of column parts, in which a chamfered part is provided at a corner of a circumferential end face.

According to the above retainer segment, even when it is inclined in the roller bearing, since the chamfered part provided at the corner of the end face is in contact with the adjacent retainer segment, it is prevented from hitting against an edge. Thus, the contact surface pressure with the adjacent retainer segment can be reduced and the friction and abrasion between them can be reduced.

According to still another aspect of the present invention, a spacer is arranged between the circumferentially arranged first retainer segment and last retainer segment. Here, a chamfered part is provided at a corner of a circumferential spacer end face.

According to the above spacer, even when it is inclined in the roller bearing, the chamfered part provided at the corner of the end face comes in contact with the adjacent retainer segment, the adjacent retainer segment can be prevented from hitting against an edge. Thus, the contact surface pressure with the adjacent retainer segment can be reduced and the friction and abrasion between them can be reduced.

According to still another aspect of the present invention, a main shaft support structure of a wind-power generator comprises a blade receiving wind power, a main shaft having one end fixed to the blade and rotating together with the blade, and a roller bearing incorporated in a fixing member and supporting the main shaft rotatably. Here, the roller bearing comprises an outer ring, an inner ring, a plurality of rollers arranged between the outer ring and the inner ring, and a plurality of retainer segments having a plurality of column parts extending in a direction along the shaft so as to form a pocket for holding the roller, and a connection part extending in a circumferential direction so as to connect the plurality of column parts, and continuously lined with each other in the circumferential direction between the outer ring and the inner ring, in which a chamfered part is provided at a corner of a circumferential end face.

Since the above main shaft structure of the wind-power generator contains the roller bearing in which the retainer segment is hardly damaged, it can implement a long life.

According to the present invention, even when the retainer segment is inclined in the radial direction or the axial direction in the roller bearing, since the corner of the circumferential end face is chamfered, the chamfered part comes in contact with the adjacent retainer segment. Thus, the contact surface pressure with the adjacent retainer segment can be lowered and the friction and abrasion between them can be reduced. Therefore, the retainer segment is hardly damaged.

According to the above retainer segment, even when it is inclined in the roller bearing, since the chamfered part provided at the corner of the end face is in contact with the adjacent retainer segment, it is prevented from hitting against an edge. Thus, the contact surface pressure with the adjacent retainer segment can be reduced and the friction and abrasion between them can be reduced.

According to the above spacer, even when it is inclined in the roller bearing, the chamfered part provided at the corner of the end face comes in contact with the adjacent retainer segment, it can be prevented from hitting against an edge. Thus, the contact surface pressure with the adjacent retainer segment can be reduced and the friction and abrasion between them can be reduced.

Since the above main shaft structure of the wind-power generator contains the roller bearing in which the retainer segment is hardly damaged, it can implement a long life.

BEST MODE FOR CARRYING OUT THE INVENTION

Figure 1:
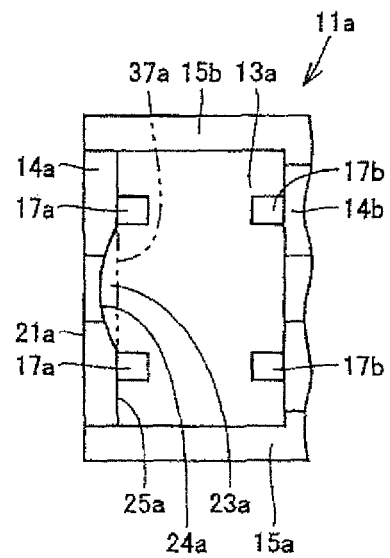
FIG. 1 is a schematic view showing the vicinity of a column part positioned on the circumferential outer side of a retainer segment, taken from the radial outer side.
Figure 2:
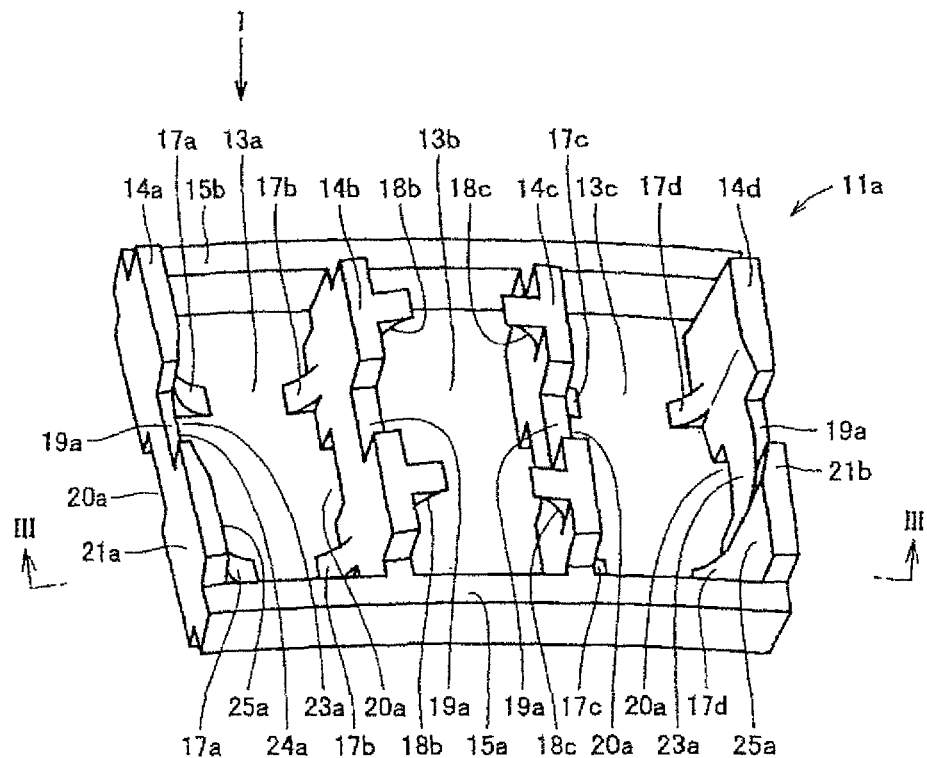
FIG. 2 is a perspective view showing the retainer segment contained in a tapered roller bearing according to one embodiment of the present invention.
Figure 3:
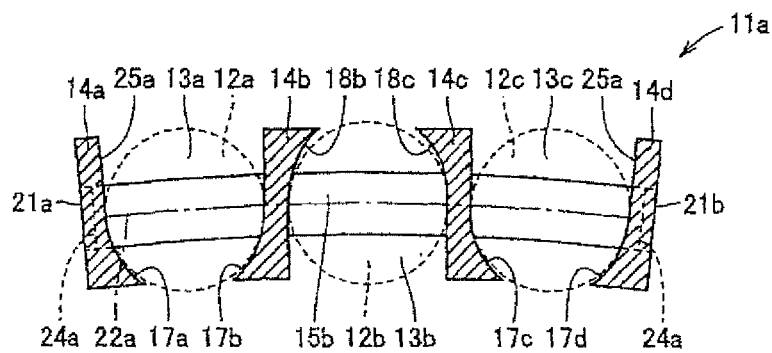
FIG. 3 is a sectional view showing the retainer segment shown in FIG. 2, cut by a plane containing a line inner III-III in FIG. 2 and intersecting with a shaft.
Figure 4:
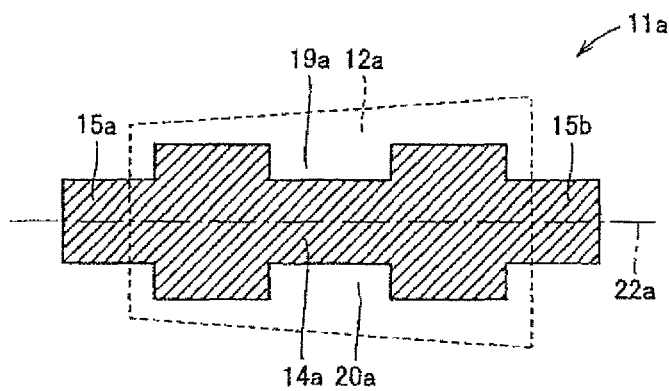
FIG. 4 is a sectional view showing the retainer segment shown in FIG. 2, cut by a plane passing through the center of the column part and intersecting with a circumferential direction.

Embodiments of the present invention will be described with reference to the drawings hereinafter. FIG. 2 is a perspective view showing a retainer segment 11a contained in a tapered roller bearing according to one embodiment of the present invention. FIG. 1 is a view showing the vicinity of a column part 14a positioned at one circumferential end in the retainer segment 11a, taken from the radial outer side, that is, from a direction shown by an arrow I in FIG. 2. FIG. 3 is a sectional view showing the retainer segment 11a shown in FIG. 2, cut by a plane containing a line III-III in FIG. 2 and intersecting with a shaft. FIG. 4 is a sectional view showing the retainer segment 11a shown in FIG. 2 cut by a plane passing through the center of the column part 14a and intersecting with a circumferential direction. In addition, in view of easy understanding, a plurality of tapered rollers 12a, 12b and 12c held by the retainer segment 11a are shown by dotted lines in FIGS. 3 and 4. In addition, a PCD 22a is shown by a dashed line.

With reference to FIGS. 1, 2, 3 and 4, the constitution of the retainer segment 11a contained in the tapered roller bearing will be described first. The retainer segment 11a is provided by splitting one annular retainer along a split line extending in an axial direction so as to have at least one pocket for holding the roller. The retainer segment 11a contains four column parts 14a, 14b, 14c and 14d extending in an axial direction so as to form pockets 13a, 13b and 13c for holding the tapered rollers 12a, 12b and 12c, and a pair of connection parts 15a and 15b extending in the circumferential direction so as to connect the four column parts 14a to 14d.

The pair of connection parts 16a and 15b has predetermined curvature radiuses in the circumferential direction so as to form the one annular retainer in the circumferential direction when the plurality of retainer segments 11a are incorporated in the tapered roller bearing. The curvature radius of the connection part 15a positioned on the small diameter side of the tapered rollers 12a to 12c is designed to be smaller than the curvature radius of the connection part 15b positioned on the large diameter side of the tapered rollers 12a to 12c, between the connection parts 15a and 15b.

Oil grooves 19a and 20a are provided at the axial center of the column parts 14a to 14d such that they are recessed from the outer diameter side and the inner diameter side toward the radial inner side and outer side, respectively and penetrate in the circumferential direction. The oil grooves 19a and 20a implement the preferable circulation of a lubricant agent.

Guide surfaces 17a, 17b, 17c, 17d, 18b, 18c for guiding the rollers are provided on the inner diameter side and the outer diameter side of the column parts 14a to 14d positioned on circumferential both sides of the pockets 13a to 13c. According to the above constitution, the retainer segment 11a is guided by the rollers and the radial movement of the retainer segment 11a can be regulated and the arrangement thereof can be stabilized. In addition, the guide surface is not provided at circumferential outer side end faces 21a and 21b of the column parts 14a and 14d positioned at circumferential both ends and a flat part is provided there. The end faces 21a and 21b of the column parts 14a and 14d abut on adjacent retainer segments.

Here, a recess 23 recessed in the circumferential direction so as to reduce the thickness of the column part 14a is provided on the circumferential inner side of the column part 14a positioned at circumferential one end, that is, on the side of the pocket 13a (refer to FIG. 1). The recess 23a is provided at the axial center of the column part 14a and comprises a curved surface 24a having a smooth arc shape. That is, the recess 23a has a roughly arc configuration. In addition, a virtual surface provided by extending a circumferential inner side end face 25a toward the recess 23a is shown by a double-dashed line in FIG. 1 as a guide gap surface 37a. The recessed amount of the recess 23a, that is, the reduced amount of the column part 14a is set such that when a load is applied from the adjacent retainer segment, the curved surface 24a does not enter the side of the pocket 13a beyond the guide gap surface 37a due to its deformation. In addition, regarding the column part 14a having the recess 23a, the guide surface 17a for guiding the roller is provided at a position of the end face 25a of the column part 14a in which the recess 23a is not provided. According to such constitution, the guide surface 17a is not affected by the deformation of the recess 23a. Therefore, the retainer segment 11a can be stably guided by the tapered roller 12a held in the pocket 13a.

In addition, the recess 23a is also provided in the column part 14d positioned at the circumferential other end, and since its constitution is the same as the recess 23a provided in the column part 14a, its description will be omitted.

Figure 5:
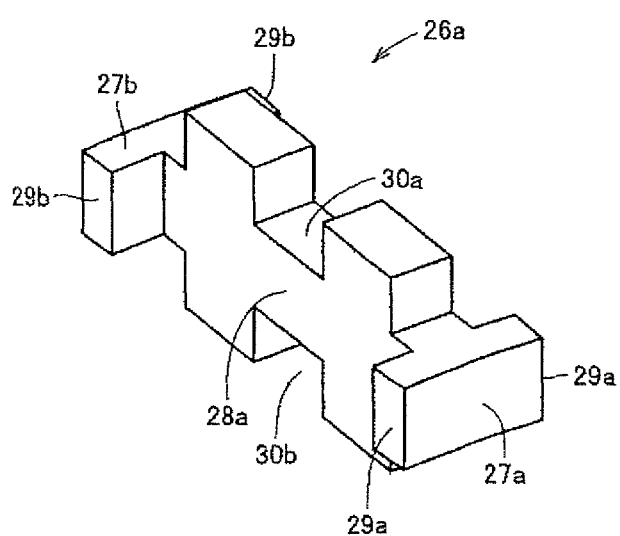
FIG. 5 is a perspective view showing a spacer contained in the tapered roller bearing.

Then, a description will be made of a spacer contained in the tapered roller bearing according to one embodiment of the present invention to adjust the dimension of a circumferential gap between the circumferentially lined retainer segments 11a and the like. FIG. 5 is a perspective view showing a spacer 26a contained in the tapered roller bearing. Referring to FIG. 5, the constitution of the spacer 26a will be described. The spacer 26a includes end parts 27a and 27b positioned at axial both ends, and a center part 28b positioned between the end parts 27a and 27b. The axial distance between the end parts 27a and 27b is the same as the axial distance between the pair of connection parts 15a and 15b contained in the above retainer segment 11a. In addition, oil grooves 30a and 30b penetrating in the circumferential direction are provided on the inner diameter surface side and the outer diameter surface side of the center part 28a.

Figure 6:
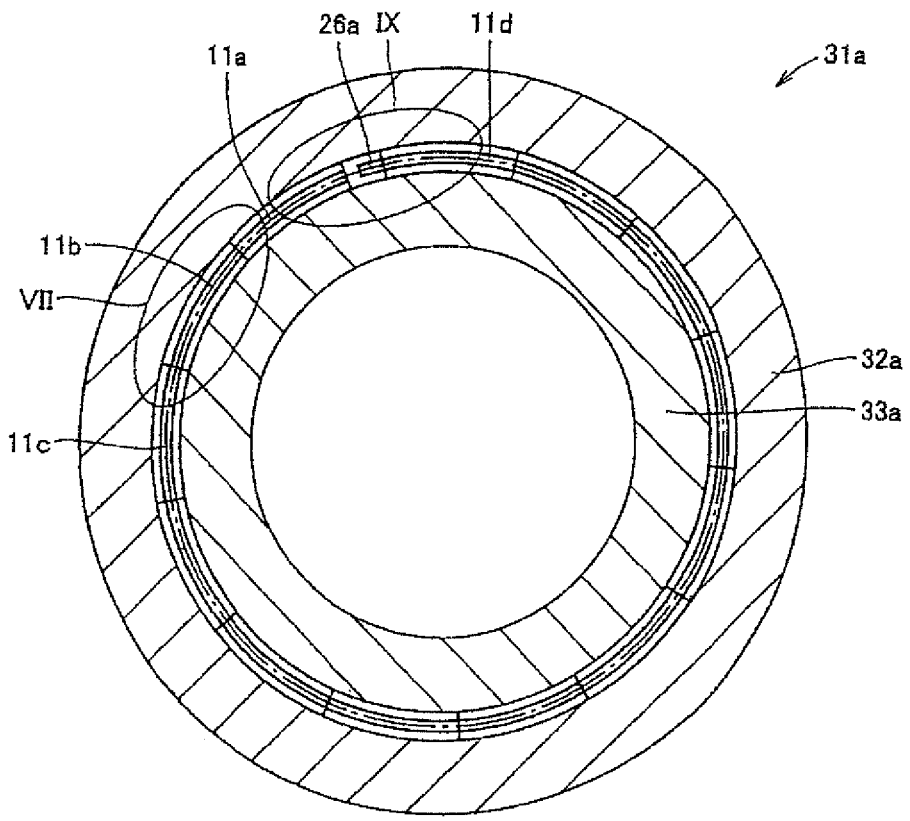
FIG. 6 is a schematic sectional view showing the tapered roller bearing in which the plurality of retainer segments and the spacer are arranged in the circumferential direction.
Figure 7:
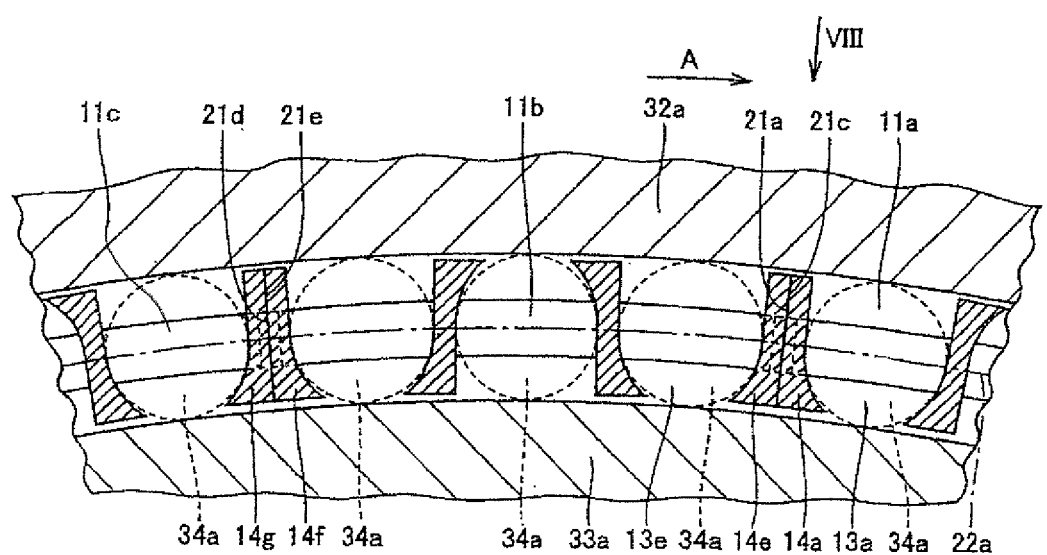
FIG. 7 is an enlarged sectional view showing the adjacent retainer segments.

Next, a description will be made of the constitution of the tapered roller bearing containing the retainer segment 11a and the spacer 26a. FIG. 6 is a schematic sectional view showing a tapered roller bearing 31a in which the plurality of retainer segments 11a, 11b, 11c and 11d and the spacer 26a are circumferentially arranged, taken in the axial direction. In addition, FIG. 7 is an enlarged sectional view showing a part VII in FIG. 6. Here, since the retainer segments 11b, 11c and 11d have the same configuration as that of the retainer segment 11a, their description will be omitted. In addition, a tapered roller 34a retained in the retainer segment 11a is omitted in FIG. 6. Furthermore, here, it is assumed that the retainer segment that is arranged first is the retainer segment 11a and the retainer segment arranged last is the retainer segment 11d among the retainer segments 11a to 11d.

Referring to FIGS. 6 and 7, the tapered roller bearing 31a comprises an outer ring 32a, an inner ring 33a, the plurality of retainer segments 11a to 11d, and the spacer 26a. The retainer segments 11a to 11d are arranged continuously in the circumferential direction. Here, the retainer segment 11a is arranged first, and then the retainer segment 11b is arranged so as to abut on the retainer segment 11a. Then, the retainer segment 11c is arranged so as to abut on the retainer segment 11b, and thus, the retainer segment is lined continuously with each other, and finally the retainer segment 11d is arranged.

Figure 8:
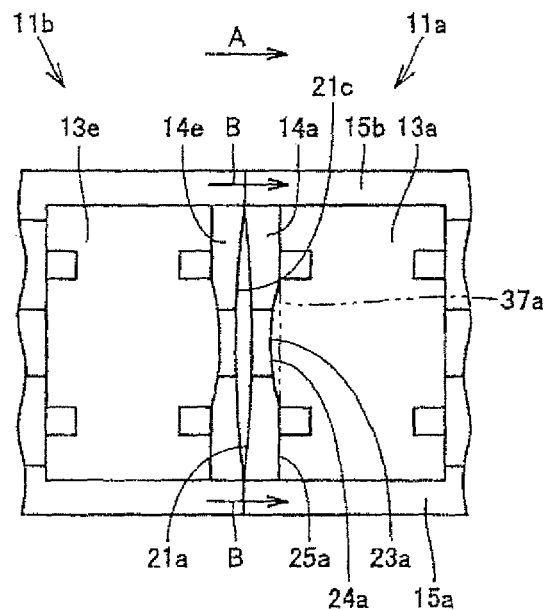
FIG. 8 is a view showing the abutment part between the retainer segments shown in FIG. 7, taken from the radial outer side.

A description will be made of a case where a circumferential load is applied from the adjacent retainer segment among the retainer segments 11a to 11c arranged as described above. FIG. 8 is a schematic view showing the abutment part between the adjacent retainer segments 11a and 11b taken from the radial outer side, that is, from a direction shown by an arrow VIII in FIG. 7. In addition, the tapered roller held by the pockets 13a and 13e in the retainer segments 11a and 11b is not shown in FIG. 8.

Referring to FIGS. 7 and 8, the circumferential outer side end face 21a of the column part 14a of the retainer segment 11a abuts on a circumferential outer side end face 21c of a column part 14e of the adjacent retainer segment 11b. While the tapered roller bearing 31a is operated, a load is applied from the adjacent retainer segment 11b in the circumferential direction, that is, in a direction shown by an arrow A in FIGS. 7 and 8. In this case, the load is applied to the column part 14a positioned at the circumferential end in the retainer segment 11a. When the column part 14a receives the load, the recess 23a of the column part 14a is deformed to the side of the pocket 13a. Since the recess 28a is formed by reducing its thickness, it is deformed with relative ease. In this case, although the curved surface 24a forming the recess 23a provided in the column part 14a is deformed to the side of the pocket 13a, the deformed curved 24a does not reach the guide gap surface 37a. Therefore, the tapered roller 34a held by the pocket 13a is prevented from being locked and the column part 14a is prevented from being abraded.

Here, when the recess 23a is bent to the side of the pocket 13a, the adjacent retainer segment 11b comes in contact with the connection parts 15a and 15b, so that the load is applied to the connection parts 15a and 15b (refer to an arrow B in FIG. 8). Since the connection parts 15a and 15b are continuously lined in the circumferential direction, they are resistant to the circumferential load and they can receive a high load. Therefore, the retainer segment 11a is not damaged by even a higher circumferential load.

As a result, the tapered roller 34a can roll appropriately, and the retainer segment 11a is prevented from being damaged.

In addition, since the recess 23a comprises the curved surface 24a having the are shape, it does not contain a corner part. Therefore, when the load is applied from the adjacent retainer segment 11b, a crack starting from the corner part can be prevented from being generated, and the column part 14a is further prevented from being damaged. In addition, it is preferable that the radius of the are of the curved surface 24a is as large as possible. Thus, the crack can be further prevented from being generated.

In addition, similarly, according to the space between the retainer segments 11b and 11c, a circumferential outer side end face 21d of a column part 14f of the retainer segment 11b abuts on a circumferential outer side end face 21e of a column part 14g of the adjacent retainer segment 11c, and even when a load is applied in the circumferential direction, the tapered roller 34a is prevented from being locked and the retainer segment 11b is prevented from being damaged due to a recess provided in the column part 14f of the retainer segment 11b.

In addition, among the retainer segments 11a to 11c, since the recess is provided at each of the column parts 14a and 14d positioned at the circumferential both ends, the retainer segments 11a to 11c can be arranged continuously in the circumferential direction without concerning about the directionality. Therefore, the productivity of the tapered roller bearing 31a can be improved.

Figure 9:
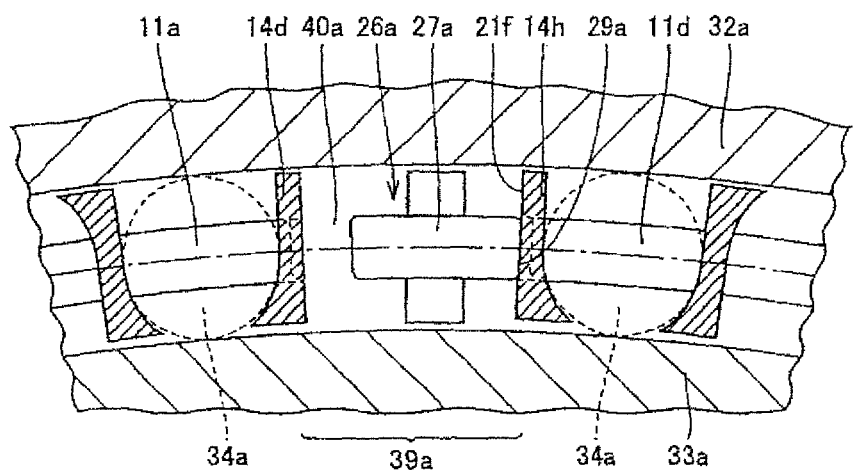
FIG. 9 is an enlarged sectional view in which the spacer is arranged between the first retainer segment and the last retainer segment.

Next, a description will be made of the arranged state of the spacer 26a arranged between the first retainer segment 11a and the last retainer segment 11d. FIG. 9 is an enlarged sectional view showing a part IX in FIG. 6. Referring to FIGS. 5, 6 and 9, the retainer segments 11a and the like are continuously arranged so as to abut on each other, and the spacer 26a is arranged between a gap 39a between the retainer segment 11a and the retainer segment 11d such that a circumferential outer side end face 21f of a column part 14h positioned at the circumferential end of the retainer segment 11d abuts on one end faces 29a and 29b of the end parts 27a and 27b. Thus, the dimension of a circumferential last gap 40a generated between the retainer segment 11a and the spacer 26a can fall within a set range easily. The last gap means a maximum gap between the first retainer segment 11a, and the spacer 26a arranged between the first retainer segment 11a and the last retainer segment 11d when the retainer segments 11a to 11d are arranged circumferentially without leaving any gap and the last retainer segment 11d and the spacer 26a are arranged without leaving any gap.

Figure 10:
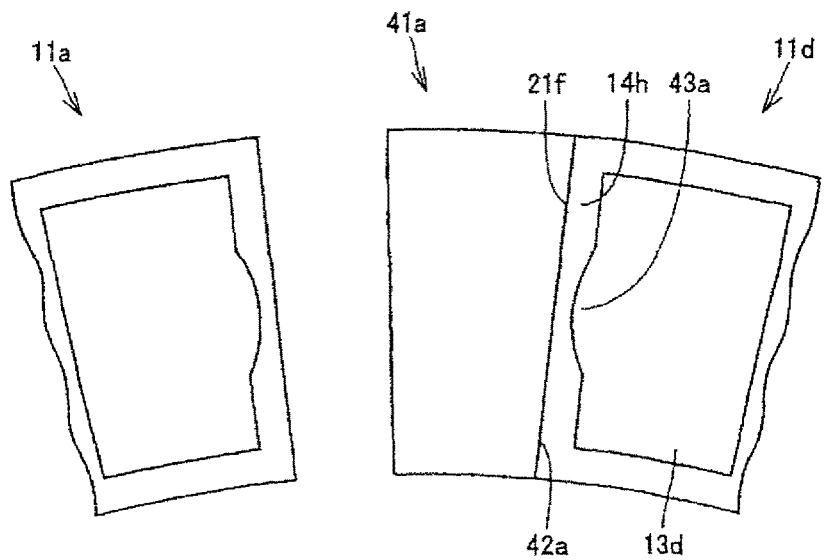
FIG. 10 is a sectional view in which a spacer having a roughly rectangular solid configuration is arranged between the first retainer segment and the last retainer segment.

Here, although the end faces 29a and 29b of the circumferential end parts 27a and 27b of the spacer 26a abut on the circumferential outer side end face 21f of the retainer segment 11d in this embodiment, it may be such that the spacer 26a is formed into a roughly rectangular solid and abuts on the whole end face 21f of the column part 14h of the adjacent retainer segment 11d. FIG. 10 is a view showing the arranged state between the retainer segment 11d and a spacer 41 taken from the radial outer side, in this case. In addition, the guide surfaces provided in the retainer segments 11a and 11d are omitted in FIG. 10. Referring to FIG. 10, the spacer 41a having the roughly rectangular solid is arranged between the retainer segments 11a and 11d such that its end face 42a abuts on the end face 21f of the column part 14h of the adjacent retainer segment 11d. Here, the circumferential load is applied from the adjacent spacer 41a to the column part 14h of the retainer segment 11d. However, since a recess 43a is provided in the column part 14h of the retainer segment 11d, the recess is bent and the load is applied to the connection parts, so that the tapered roller 34a is prevented from being locked and the column part 14h is prevented from being abraded, so that the retainer segment 11d can be prevented from being damaged.

Figure 11A:
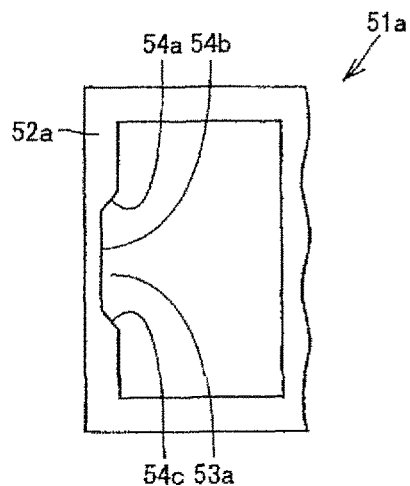
FIG. 11A is a view showing a retainer segment according to another embodiment of the present invention, taken from the radial outer side, in which a recess comprises a plurality of flat surfaces.

In addition, although the recess comprises the curved surface having the arc shape in the above embodiment, the present invention is not limited to this, and a recess may comprise a plurality of flat surfaces. FIG. 11A is a view showing a part of a retainer segment in which a recess comprising a plurality of flat surfaces is provided in a column part at a circumferential end. Referring to FIG. 11A, a recess 53a provided in a column part 52a of a retainer segment 51a comprises a plurality of flat surfaces 54a, 54b and 54c. In this constitution of the recess 53a, the tapered roller can be prevented from being locked and the like.

Figure 11B:
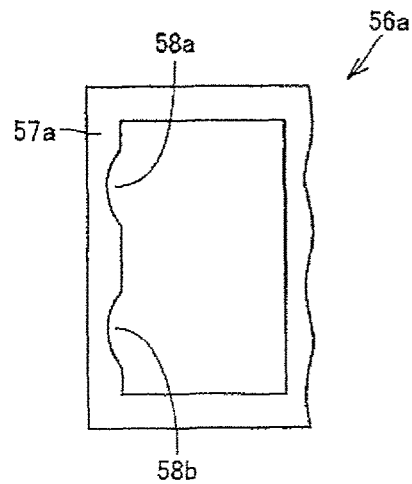
FIG. 11B is a view showing a retainer segment according to still another embodiment of the present invention, taken from the radial outer side, in which two recesses are provided.

In addition, as shown in FIG. 11B, a plurality of recesses may be provided in a column part 57a of a retainer segment 56a. Thus, the load applied from the circumferential direction can be dispersed by a plurality of recesses 58a and 58b. Although the two recesses 58a and 58b are provided in this case, they may be provided more than two.

In addition, although the recess is provided in the column part at the circumferential each end of the retainer segment in the above embodiment, the present invention is not limited to this and the recess may be provided only in the column part at one end. In this case, since the recess of the one column part of the retainer segment is bent toward the pocket, even when the column part of the adjacent retainer segment is not bent, the adjacent retainer segments abut on each other at the connection parts. Therefore, the above effect can be provided when the recess is provided in the column part of the at least one retainer segment of the adjacent retainer segments. In addition, in this case, the tapered roller can be prevented from being locked more effectively by aligning the recesses when the retainer segments are continuously lined in the circumferential direction.

Figure 12:
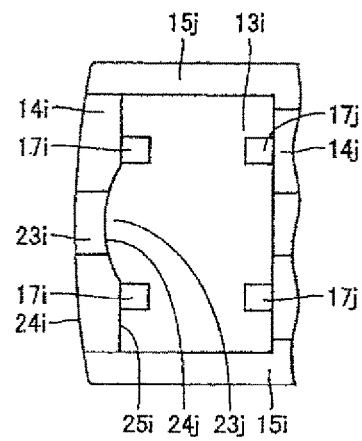
FIG. 12 is a schematic view showing the vicinity of a column part positioned on the circumferential outer side of a retainer segment contained in a tapered roller bearing according to still another embodiment of the present invention, taken from the radial outer side.
Figure 13:
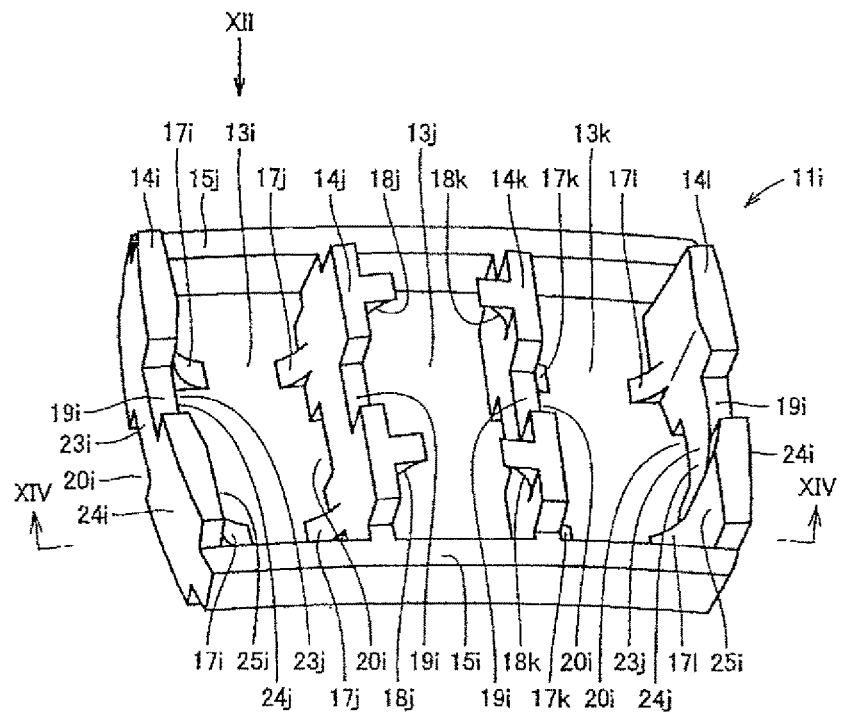
FIG. 13 is a perspective view showing the retainer segment contained in the tapered roller bearing according to still another embodiment of the present invention.
Figure 14:
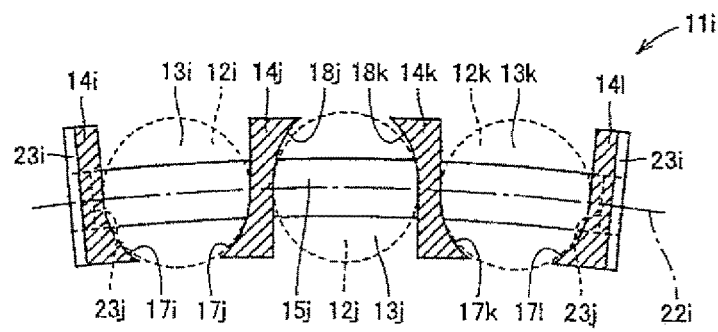
FIG. 14 is a sectional view showing the retainer segment shown in FIG. 13, cut by a plane containing a line XIV-XIV in FIG. 13 and intersecting with a shaft.
Figure 15:
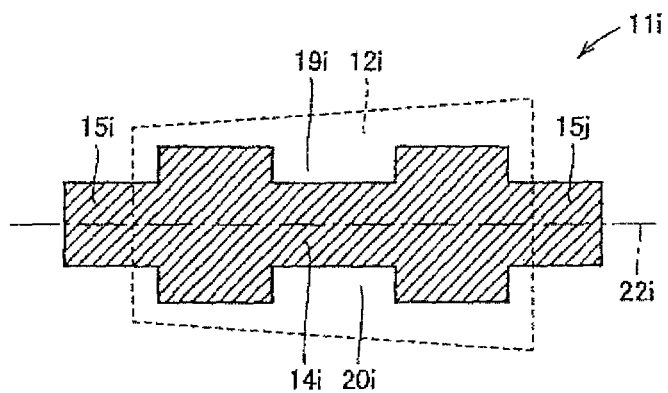
FIG. 15 is a sectional view showing the retainer segment shown in FIG. 13, cut by a plane passing through the center of the column part and intersecting with a circumferential direction.

A tapered roller bearing according to still another embodiment of the present invention will be described. FIG. 13 is a perspective view showing a retainer segment 11i contained in a tapered roller bearing according to still another embodiment of the present invention. FIG. 12 is a view showing the vicinity of a column part 14i positioned on circumferential one end in the retainer segment 11i, taken from the radial outer side, that is, from a direction shown by an arrow XII in FIG. 13. FIG. 14 is a sectional view showing the retainer segment 11i shown in FIG. 13, cut along arrows XIV-XIV in FIG. 13 in the radial direction. In addition, FIG. 15 is a sectional view showing the retainer segment 11i cut along the section containing the column part 14i in the axial direction. In addition, in view of easy understanding, a plurality of tapered rollers 12i, 12j and 12k held by the retainer segment 11i are shown by dotted lines in FIGS. 14 and 15. In addition, a PCD 22i is shown by a dashed line.

With reference to FIGS. 12, 13, 14 and 15, the constitution of the retainer segment 11i contained in the tapered roller bearing will be described first. The retainer segment 11i is provided by splitting one annular retainer along a split line extending in an axial direction so as to have at least one pocket for holding the roller. The retainer segment 11i contains four column parts 14i, 14j, 14k and 14l extending in the axial direction so as to form pockets 13i, 13j and 13k for holding the tapered rollers 12i, 12j and 12k, and a pair of connection parts 15i and 15j extending in the circumferential direction so as to connect the four column parts 14i to 14l.

The pair of connection parts 15i and 15j has predetermined curvature radiuses in the circumferential direction so as to form the one annular retainer in the circumferential direction when the plurality of retainer segments 11i are incorporated in the tapered roller bearing. The curvature radius of the connection part 15i positioned on the small diameter side of the tapered rollers 12i to 12k is designed to be smaller than the curvature radius of the connection part 15j positioned on the large diameter side of the tapered rollers 12i to 12k, between the connection parts 15i and 15j.

Oil grooves 19i and 20i are provided at the axial center of the column parts 14i to 14l such that they are recessed from the outer diameter side and the inner diameter side toward the radial inner side and outer side, respectively and penetrate in the circumferential direction. The oil grooves 19i and 20i implement the preferable circulation of a lubricant agent.

Guide surfaces 17i, 17j, 17k, 17l, 18j, 18k for guiding the rollers are provided on the inner diameter side and the outer diameter side of the column parts 14i to 14l positioned on circumferential both sides of the pockets 13i to 13k. According to the above constitution, the retainer segment 11i is guided by the rollers and the radial movement of the retainer segment 11i can be regulated and the arrangement thereof can be stabilized.

Here, an expansion part 23i expanding in the circumferential direction is provided on the circumferential outer side of the column part 14i positioned at circumferential one end. In addition, a recess 23j recessed from a circumferential inner side end face 25i in the circumferential direction is provided on the circumferential inner side of the column part 14i, that is, on the pocket 13i side (refer to FIG. 12). The expansion part 23i and the recess 23j comprise curved surfaces 24i and 24j having smooth arc shapes, respectively. In addition, the recess 23j has the substantially the same configuration as that of the expansion part 23$i$. In addition, the recess 23$j$ is provided at the axial center of the column part 14$i$.

In addition, regarding the column part 14$i$ having the expansion part 23$i$ and the recess 23$j$, a guide surface 17$i$ for guiding the roller is provided at a position of the end face 25$i$ of the column part 14$i$ in which the recess 23$j$ is not provided. According to such constitution, the guide surface 17$i$ is not affected by the deformation of the recess 23$j$. Therefore, the retainer segment 11$i$ can be stably guided by the tapered roller 12$i$ held in the pocket 13$i$.

In addition, although the expansion part 23$i$ and the recess 23$j$ are also provided in the column part 14$l$ positioned at the circumferential other end, since their constitutions are the same as the expansion part 23$i$ and the recess 23$j$ provided in the column part 14$i$, their description will be omitted.

Figure 16:
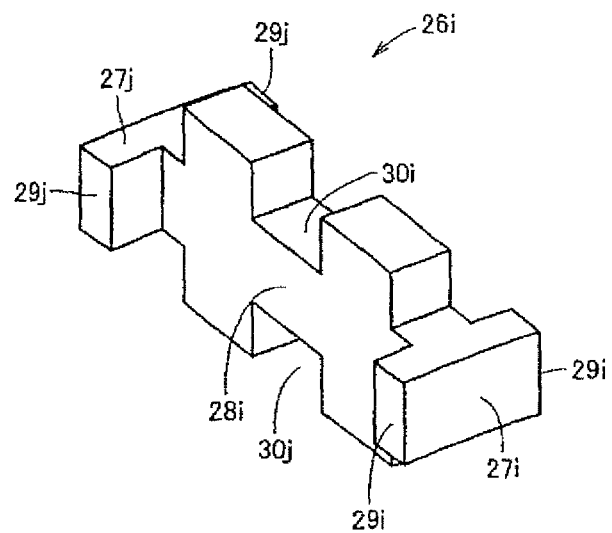
FIG. 16 is a perspective view showing a spacer contained in the tapered roller bearing according to still another embodiment of the present invention.

Then, a description will be made of a spacer contained in the tapered roller bearing according to still another embodiment of the present invention to adjust the dimension of a circumferential gap between the circumferentially lined retainer segments 11$i$ and the like. FIG. 16 is a perspective view showing a spacer 26$i$ contained in the tapered roller bearing. Referring to FIG. 16, the constitution of the spacer 26$i$ will be described. The spacer 26$i$ includes end parts 27$i$ and 27$j$ positioned at axial both ends, and a center part 28$i$ positioned between the end parts 27$i$ and 27$j$. The axial distance between the end parts 27$i$ and 27$j$ is the same as the axial distance between the pair of connection parts 15$i$ and 15$j$ contained in the above retainer segment 11$i$. In addition, oil grooves 30$i$ and 30$j$ penetrating in the circumferential direction are provided on the inner diameter surface side and the outer diameter surface side of the center part 28$i$.

Figure 17:
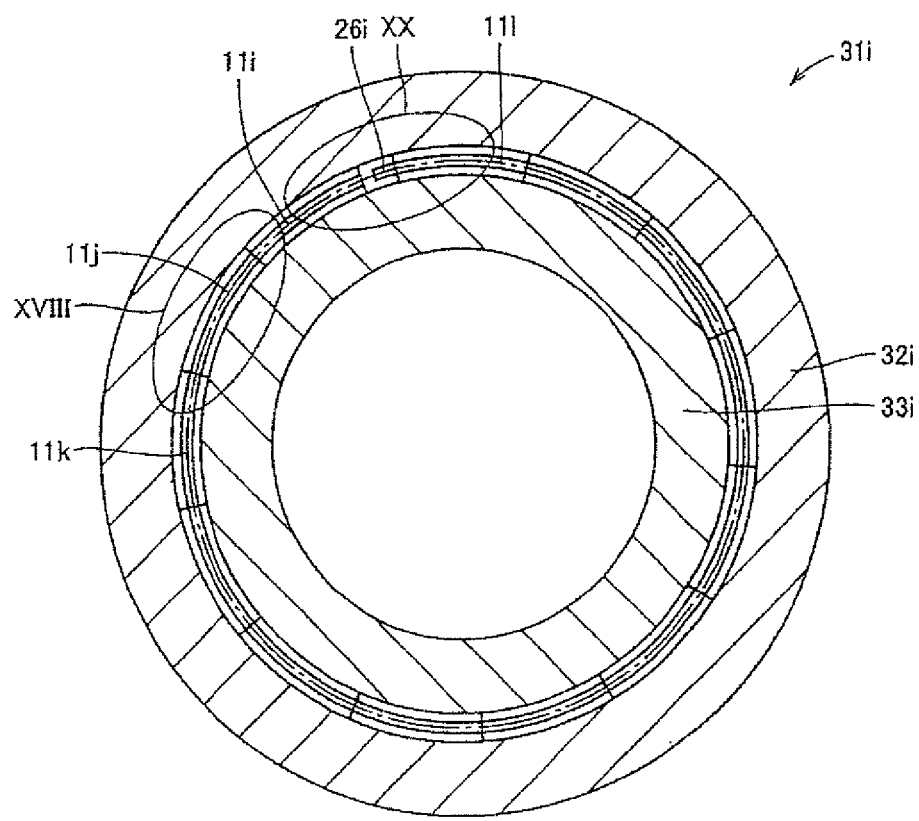
FIG. 17 is a schematic sectional view showing the tapered roller bearing in which the plurality of retainer segments and the spacer are arranged in the circumferential direction.
Figure 18:
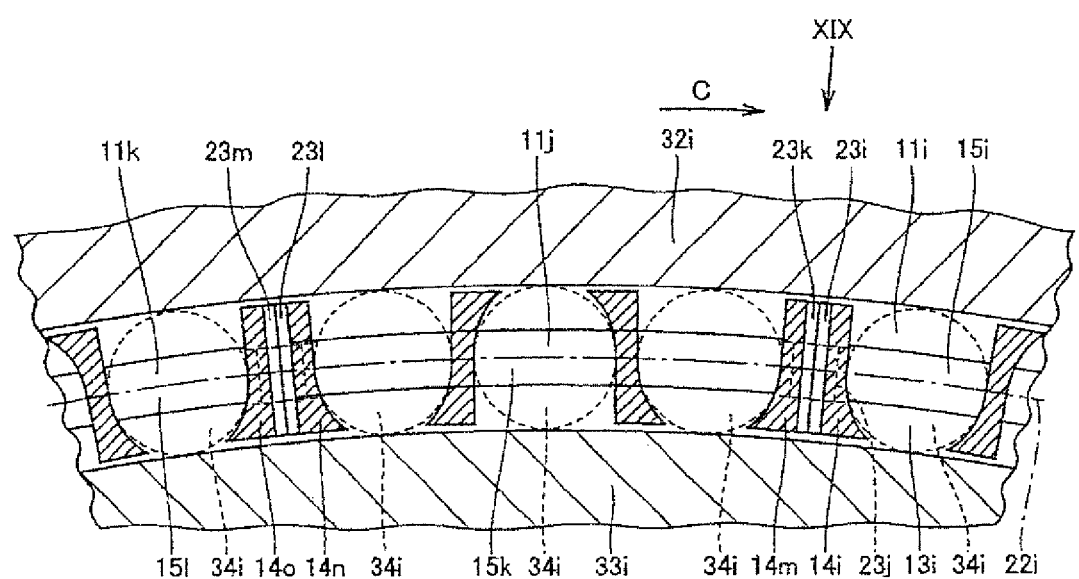
FIG. 18 is an enlarged sectional view showing the adjacent retainer segments.

Next, a description will be made of the constitution of the tapered roller bearing containing the retainer segment 11$i$ and the spacer 26$i$. FIG. 17 is a schematic sectional view showing a tapered roller bearing 31$i$ in which the plurality of retainer segments 11$i$, 11$j$, 11$k$ and 11$l$ and the spacer 26$i$ are circumferentially arranged, taken from the axial direction. In addition, FIG. 18 is an enlarged sectional view showing a part XVIII in FIG. 17. Here, since the retainer segments 11$j$, 11$k$ and 11$l$ have the same configuration as that of the retainer segment 11$i$, their description will be omitted. In addition, a tapered roller 34$i$ retained in the retainer segment 11$a$ is omitted in FIG. 17. Furthermore, here, it is assumed that the retainer segment that is arranged first is the retainer segment 11$i$ and the retainer segment arranged last is the retainer segment 11$l$ among the retainer segments 11$i$ to 11$l$.

Referring to FIGS. 17 and 18, the tapered roller bearing 31$i$ comprises an outer ring 32$i$, an inner ring 33$i$, the plurality of retainer segments 11$i$ to 11$l$, and the spacer 26$i$. The retainer segments 11$i$ to 11$l$ are arranged continuously in the circumferential direction. Here, the retainer segment 11$i$ is arranged first, and then the retainer segment 11$j$ is arranged so as to abut on the retainer segment 11$i$. Then, the retainer segment 11$k$ is arranged so as to abut on the retainer segment 11$j$, and the retainer segment is arranged continuously, and finally the retainer segment 11$l$ is arranged.

Figure 19:
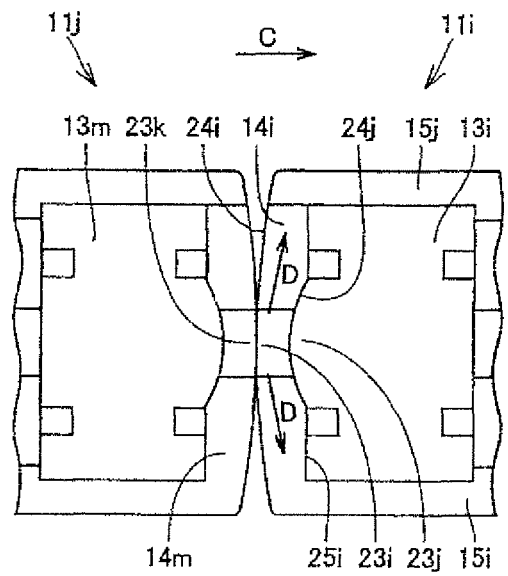
FIG. 19 is a view showing the abutment part between the retainer segments shown in FIG. 18, taken from the radial outer side.

A description will be made of a case where a circumferential load is applied from the adjacent retainer segment among the retainer segments 11$i$ to 11$l$ arranged as described above. FIG. 19 is a schematic view showing the abutment part between the adjacent retainer segments 11$i$ and 11$j$, taken from the radial outer side, that is, from a direction shown by an arrow XIX in FIG. 18. In addition, the tapered rollers held by the pockets 13$i$ and 13$m$ in the retainer segments 11$i$ and 11$j$ are not shown in FIG. 19.

Referring to FIGS. 18 and 19, the expansion part 23$i$ of the column part 14$i$ of the retainer segment 11$i$ abuts on an expansion part 23$k$ of a column part 14$m$ of the retainer segment 11$j$. While the tapered roller bearing 31$i$ is operated, a load is applied from the adjacent retainer segment 11$j$ in the circumferential direction, that is, in a direction shown by an arrow C in FIGS. 18 and 19. In this case, the load is applied to the column part 14$i$ positioned at the circumferential end in the retainer segment 11$i$.

Here, the recess 23$j$ having substantially the same configuration as that of the expansion part 23$i$ is provided on the side of the pocket 13$i$ of the column part 14$i$. Therefore, the load applied from the adjacent retainer segment 11$j$ is transferred to the connection parts 15$i$ and 15$j$ along the configuration of the column part 14$i$ as shown by an arrow D in FIG. 19. Thus, the deformation of the column part 14$i$ due to the circumferential load can be suppressed, and the tapered roller 34$i$ held in the pocket 13$i$ can be prevented from being locked and the column part 14$i$ is prevented from being abraded. In addition, since the connection parts 15$i$ and 15$j$ are continuously lined in the circumferential direction, they are resistant to the circumferential load and they can receive a high load. As a result, the retainer segment 11$i$ can be prevented from being damaged.

Here, since the expansion part 23$i$ and the recess 23$a$ comprise the curved surfaces 24$i$ and 24$j$ having the are shapes, respectively, they do not contain a corner part. Therefore, the column part 14$i$ can be further prevented from being deformed. In addition, the radiuses of the arcs constituting the curved surfaces 24$i$ and 24$j$ are preferably as small as possible. Thus, the load can be transmitted to the connection parts 15$i$ and 15$j$ effectively. However, when the radius of the arc of the curved surface 24$j$ is too small, it could be damaged by a crack. Therefore, the radius of the arc of the curved surface 24$j$ is large to some extent to prevent the above.

In addition, similarly, according to the retainer segments 11$j$ and 11$k$, an expansion part 23$l$ of a column part 14$n$ of the retainer segment 11$j$ abuts on an expansion part 23$m$ of a column part 14$o$ of the adjacent retainer segment 11$k$, and even when a load is applied in the circumferential direction, since the load can be transmitted to the connection parts 15$k$ and 15$l$, the retainer segments 11$j$ and 11$k$ can be prevented from being damaged.

In addition, in the retainer segment 11$i$, since the expansion part 23$i$ and the recess 23$j$ are provided at each of the column parts 14$i$ and 14$l$ positioned at the circumferential both ends, the retainer segments 11$i$ to 11$k$ can be arranged continuously in the circumferential direction without concerning about the directionality. Therefore, the productivity of the tapered roller bearing 31$i$ can be improved.

Figure 20:
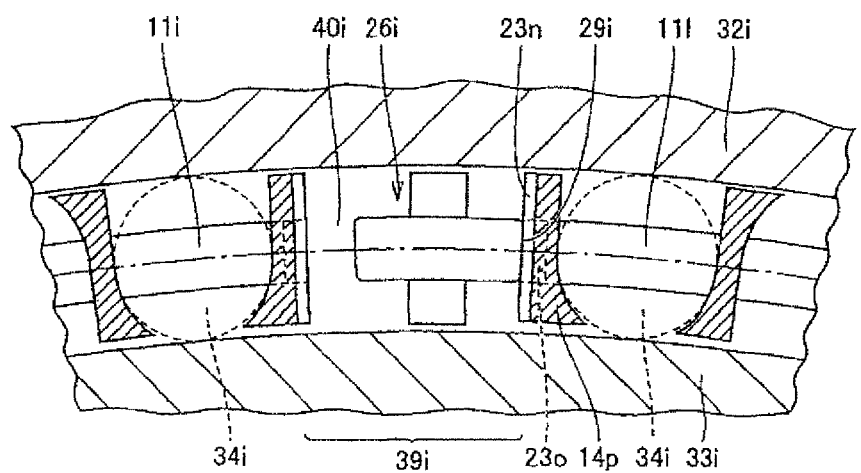
FIG. 20 is an enlarged sectional view in which the spacer is arranged between the first retainer segment and the last retainer segment.

Next, a description will be made of the arranged state of the spacer 26$i$ arranged between the first retainer segment 11$i$ and the last retainer segment 11$l$. FIG. 20 is an enlarged sectional view showing a part XX in FIG. 17. Referring to FIGS. 16, 17 and 20, the retainer segments 11$i$ and the like are continuously arranged so as to abut on each other, and the spacer 26$i$ is arranged between a gap 39$i$ between the retainer segment 11$i$ and the retainer segment 11$l$ such that an expansion part 23$n$ of a column part 14$p$ positioned at the circumferential end of the retainer segment 11$l$ abuts on one end faces 29$i$ and 29$j$ of the end parts 27$i$ and 27$j$ of the spacer 26$i$. Thus, the dimension of a circumferential last gap 40$i$ generated between the retainer segment 11$i$ and the spacer 26$i$ can fall within a set range easily. The last gap means a maximum gap between the first retainer segment 11$i$, and the spacer 26$i$ arranged between the first retainer segment 11*i* and the last retainer segment 11*l* when the retainer segments 11*i* to 11*l* are arranged circumferentially without leaving any gap, and the last retainer segment 11*l* and the spacer 26*i* are arranged without leaving any gap.

Figure 21:
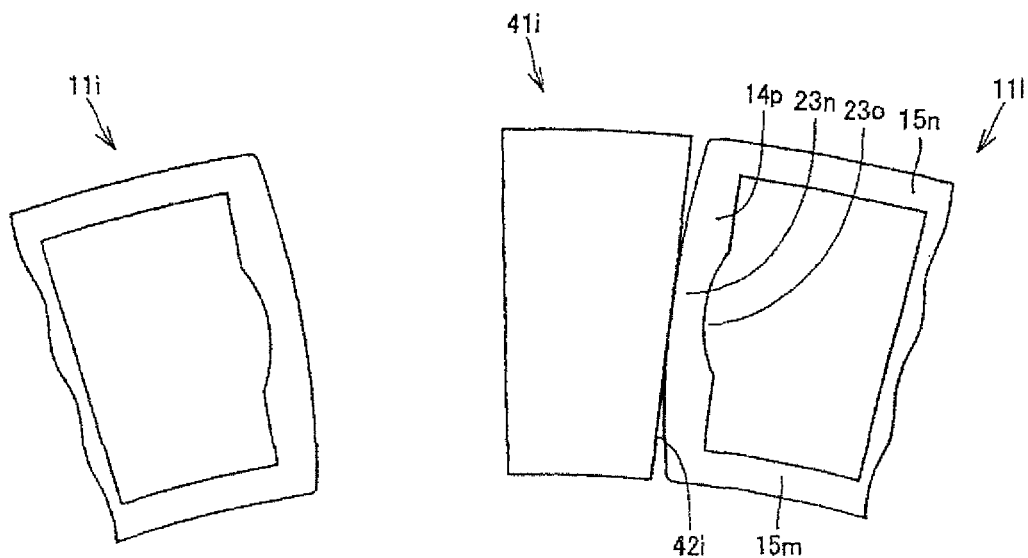
FIG. 21 is a sectional view in which a spacer having a roughly rectangular solid configuration is arranged between the first retainer segment and the last retainer segment.

Here, although the end faces 29*i* and 29*j* of the circumferential end parts 27*i* and 27*j* of the spacer 26*i* abut on the circumferential outer side expansion part 23*n* of the retainer segment 11*l* in this embodiment, it may be such that the spacer 26*i* is formed into a roughly rectangular solid and abuts on the expansion part 23*n* of the column part 14*p* of the adjacent retainer segment 11*l*. FIG. 21 is a view showing the arranged state between the retainer segment 11*l* and a spacer 41*i*, taken from the radial outer side, in this case. In addition, the guide surfaces provided in the retainer segments 11*i* and 11*l* are omitted in FIG. 21. Referring to FIG. 21, the spacer 41*i* having the roughly rectangular solid is arranged between the retainer segments 11*i* and 11*l* such that its circumferential end face 42*i* abuts on the expansion part 23*n* of the column part 14*p* of the adjacent retainer segment 11*l*. Here, the circumferential load is applied from the adjacent spacer 41*i* to the column part 14*p* of the retainer segment 11*l*. However, since the load applied to the column part 14*p* is transmitted to the connection parts 15*m* and 15*n* along the configuration of the column part 14*p* due to the expansion part 23*n* and the recess 23*o*, the retainer segment 11*l* can be prevented from being damaged.

Figure 22A:
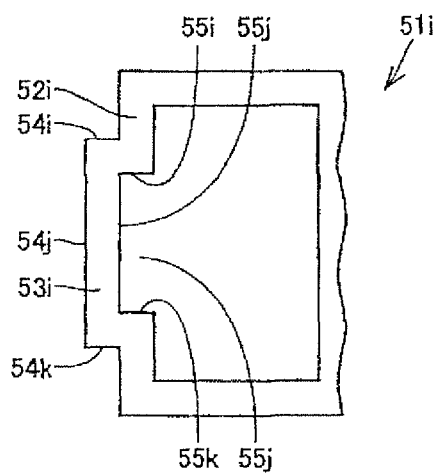
FIG. 22A is a view showing a retainer segment according to still another embodiment of the present invention, taken from the radial outer side, in which an expansion part and a recess comprise a plurality of flat surfaces.

In addition, although the expansion part and the recess comprise the curved surfaces having the arc shapes in the above embodiment, the present invention is not limited to this, and an expansion part and a recess may comprise a plurality of flat surfaces. FIG. 22A is a view showing a part of a retainer segment in which an expansion part and a recess comprising a plurality of flat surfaces are provided in a column part at a circumferential end. Referring to FIG. 22A, an expansion part 53*i* provided in a column part 52*i* of a retainer segment 51*i* comprises a plurality of flat surfaces 54*i*, 54*j* and 54*k*. In addition, a recess 53*j* comprises a plurality of flat surfaces 55*i* 55*j* and 55*k*. According to the constitution of the expansion part 53*i* and the recess 53*j*, the retainer segment 51*i* can be prevented from being damaged.

Figure 22B:
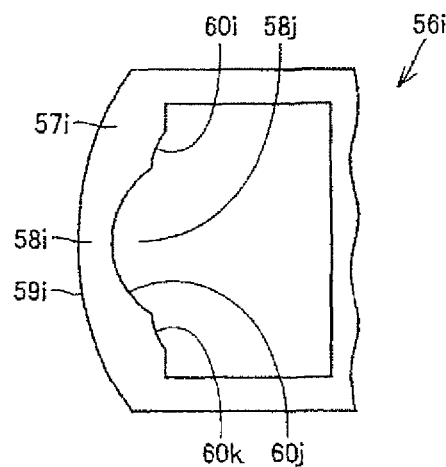
FIG. 22B is a view showing a retainer segment according to still another embodiment of the present invention, taken from the radial outer side, in which an expansion part comprises a crowning configuration and a recess comprises three curved surfaces.

In addition, as shown in FIG. 22B, according to an expansion part 58*i* and a recess 58*j* provided in a column part 57*i* of a retainer segment 56*i*, the recess 58*j* may comprise a plurality of curved surfaces 60*i*, 60*j* and 60*k*. In addition, a curved surface 59*i* constituting the expansion part 58*i* may have a crowning shape.

In addition, although the expansion part and the recess are provided in each of the column parts at the circumferential both ends of the retainer segment in the above embodiment, the present invention is not limited to this and the expansion part and the recess may be provided only in the column part at one end. In this case, the retainer segment can be effectively prevented from being damaged by aligning the arrangements of the column parts in which the expansion part and the recess are provided when the retainer segments are arranged in the circumferential direction continuously.

Figure 23:
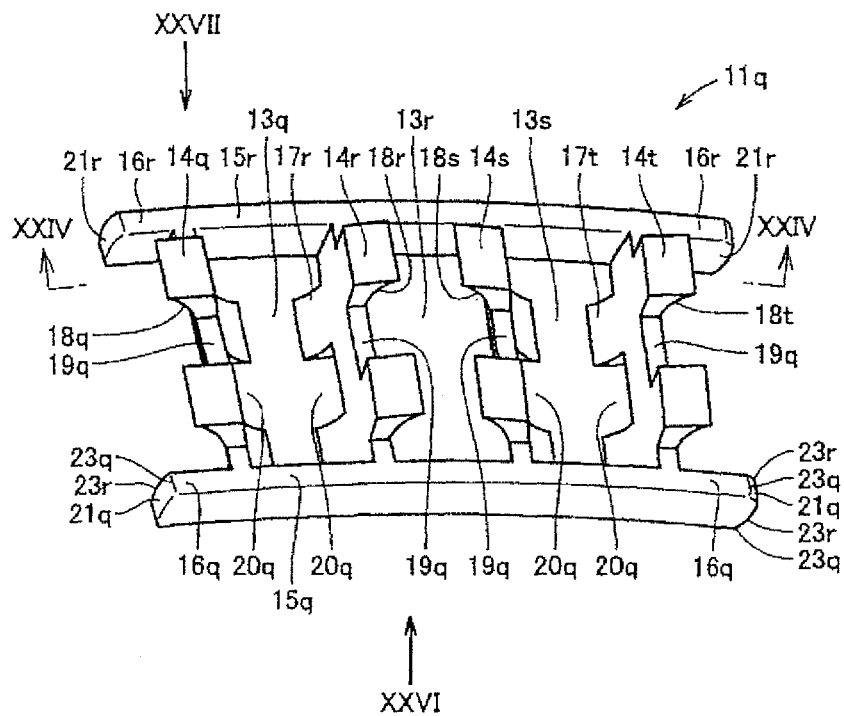
FIG. 23 is a perspective view showing a retainer segment contained in a tapered roller bearing according to still another embodiment of the present invention.
Figure 24:
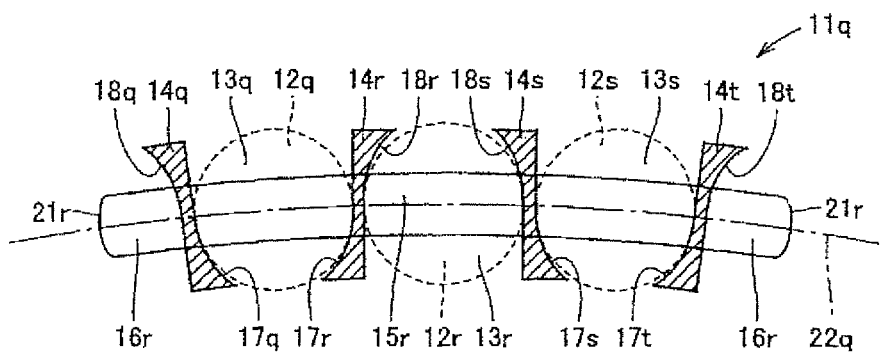
FIG. 24 is a sectional view showing the retainer segment shown in FIG. 23, cut by a plane containing a line XXIV-XXIV in FIG. 23 and intersecting with a shaft.
Figure 25:
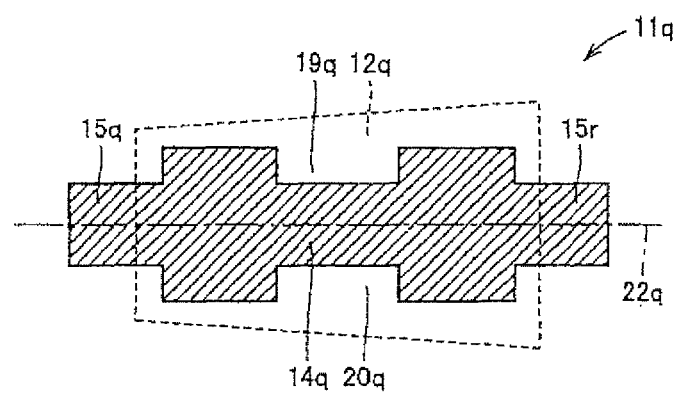
FIG. 25 is a sectional view showing the retainer segment shown in FIG. 23, cut by a plane passing through the center of the column part and intersecting with a circumferential direction.

A tapered roller bearing according to still another embodiment of the present invention will be described hereinafter. FIG. 23 is a perspective view showing a retainer segment 11*q* contained in the tapered roller bearing according to still another embodiment of the present invention. FIG. 24 is a sectional view showing the retainer segment 11*q* shown in FIG. 23 cut by a plane containing a line XXIV-XXIV in FIG. 23 and intersecting with a shaft. In addition, FIG. 25 is a sectional view showing the retainer segment 11*q* shown in FIG. 23 cut by a plane passing through the center of a column part 14*q* and intersecting with a circumferential direction. In addition, in view of easy understanding, a chamfered part and a crowning part are shown with exaggeration and a plurality of tapered rollers 12*q*, 12*r* and 12*s* held by the retainer segment 11*q* are shown by dotted lines in FIGS. 24 and 25. In addition, a PCD 22*q* is shown by a dashed line.

With reference to FIGS. 23, 24 and 25, the constitution of the retainer segment 11*q* contained in the tapered roller bearing will be described first. The retainer segment 11*q* is provided by splitting one annular retainer along a split line extending in an axial direction so as to have at least one pocket for holding the roller. The retainer segment 11*q* contains four column parts 14*q*, 14*r*, 14*s* and 14*t* extending in the axial direction so as to form pockets 13*q*, 13*r* and 13*s* for holding the tapered rollers 12*q*, 12*r* and 12*s*, a pair of connection parts 15*q* and 15*r* extending in the circumferential direction so as to connect the four column parts 14*q* to 14*t*, and a pair of projections 16*q* and 16*r* projecting in the circumferential direction.

The pair of connection parts 15*q* and 15*r* and the pair of projections 16*q* and 16*r* have predetermined curvature radiuses in the circumferential direction so as to form the one annular retainer in the circumferential direction when the plurality of retainer segments 11*q* and the like are incorporated in the tapered roller bearing. The curvature radiuses of the connection part 15*q* and the projection 16*q* positioned on the small diameter side of the tapered rollers 12*q* to 12*s* are designed to be smaller than the curvature radiuses of the connection part 15*r* and the projection 16*r* positioned on the large diameter side of the tapered rollers 12*q* to 12*s*, among the pair of connection parts 15*q* and 15*r* and the pair of projections 16*q* and 16*r*.

When end faces 21*q* and 21*r* of the pair of projections 16*q* and 16*r* abut on another retainer segment, a pocket for holding the tapered roller is formed between the retainer segment 11*q* and another retainer segment.

Guide surfaces 17*q*, 17*r*, 17*s*, 17*t*, 18*q*, 18*r*, 18*s* and 18*t* are provided on the inner diameter side and the outer diameter side of the column parts 14*q* to 14*t* positioned on circumferential both sides of the pockets 13*q* to 13*s*. According to the above constitution, the retainer segment is guided by the rollers and the radial movement of the retainer segment 11*q* can be regulated. Oil grooves 19*q* and 20*q* are provided at the axial center of the column parts 14*q* to 14*t* such that they are recessed from the outer diameter side and the inner diameter side toward the radial inner side and outer side, respectively and penetrate in the circumferential direction. The oil grooves 19*q* and 20*q* implement the preferable circulation of a lubricant agent.

Figure 26A:
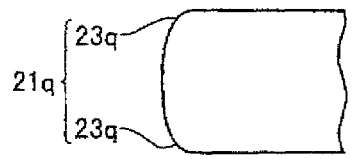
FIG. 26A is a view showing a circumferential end face of the retainer segment, taken from the axial direction, in which a full crowning is provided.
Figure 27A:
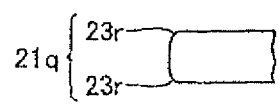
FIG. 27A is a view showing the circumferential end face of the retainer segment, taken from the radial direction, in which a full crowning is provided.

Here, a description will be made of the configuration of the end face 21*q* positioned on the small diameter side of the tapered rollers 12*q* to 12*s*, of the circumferential end faces 21*q* and 21*r* of the retainer segment 11*q*. FIG. 26A is a view showing the end face 21*q* taken from the axial direction, that is, taken from the direction shown by an arrow XXVI in FIG. 23. In addition, FIG. 27A is a view showing the end face 21*q* taken from the radial direction, that is, taken from the direction of an arrow XXVII ring in FIG. 23.

Referring to FIGS. 23, 24, 26A and 27A, a radial corner 23*q* of the end face 21*q* is chamfered. In addition, an axial corner 23*r* of the end face 21*q* is also chamfered. Furthermore, a full crowning is provided in the end face 21*q* in the radial direction and axial direction. That is, the end face 21*q* expands in the circumferential direction from the radial and axial corners 23*q* and 23*r* toward the radial and axial center. In addition, since the circumferential end face 21*r* positioned on the large diameter side of the tapered rollers 12*q* to 12s has the same configuration as that of the end face 21q, its description will be omitted.

Figure 28:
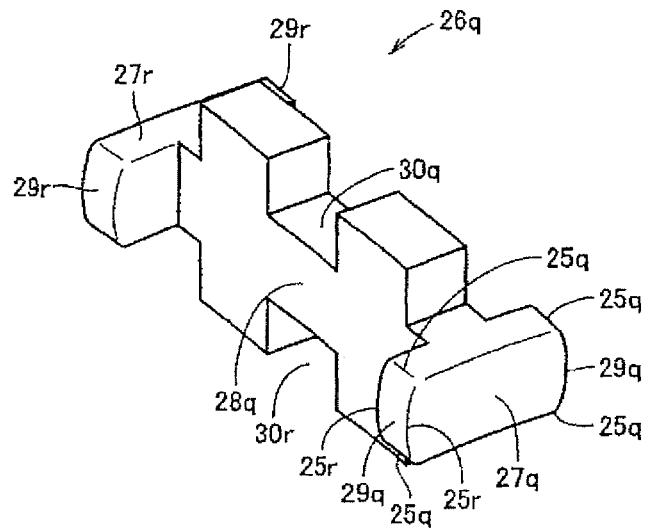
FIG. 28 is a perspective view showing a spacer contained in the tapered roller bearing.

Then, a description will be made of a spacer contained in the tapered roller bearing according to still another embodiment of the present invention to adjust the dimension of a circumferential gap between the circumferentially lined retainer segments 11q and the like. FIG. 28 is a perspective view showing a spacer 26q contained in the tapered roller bearing. Referring to FIG. 28, the constitution of the spacer 26q will be described. The spacer 26q includes end parts 27q and 27r positioned at axial both ends, and a center part 28q positioned between the end parts 27q and 27r. The axial distance between the end parts 27q and 27r is the same as the axial distance between the pair of projections 16q and 16r contained in the above retainer segment 11q. In addition, oil grooves 30q and 30r penetrating in the circumferential direction are provided on the inner diameter surface side and the outer diameter surface side of the center part 28q.

Here, a description will be made of the configuration of a circumferential spacer end face 29q of the end part 27q of the spacer 26q. A radial corner 25q of the spacer end face 29q is chamfered. In addition, the axial corner 25q of the spacer end face 29q is also chamfered. Furthermore, a full crowning is provided in the spacer end face 29q in the radial direction and the axial direction. That is, the spacer end face 29q has a configuration expanding in the circumferential direction from the radial and axial corners 25q and 25r toward the radial and axial center. In addition, since a circumferential spacer end face 29r of the end part 27r of the spacer 26q has the same configuration as that of the spacer end face 29q, its description will be omitted.

Figure 29:
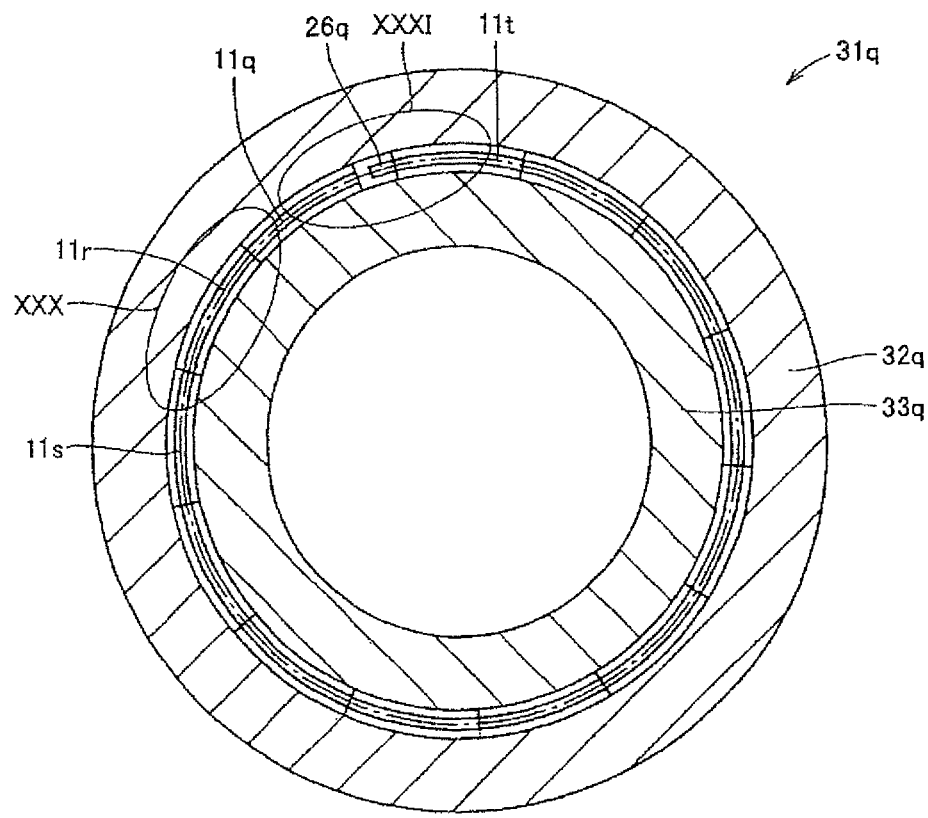
FIG. 29 is a schematic sectional view showing the tapered roller bearing in which the plurality of retainer segments and the spacer are arranged in the circumferential direction.
Figure 30:
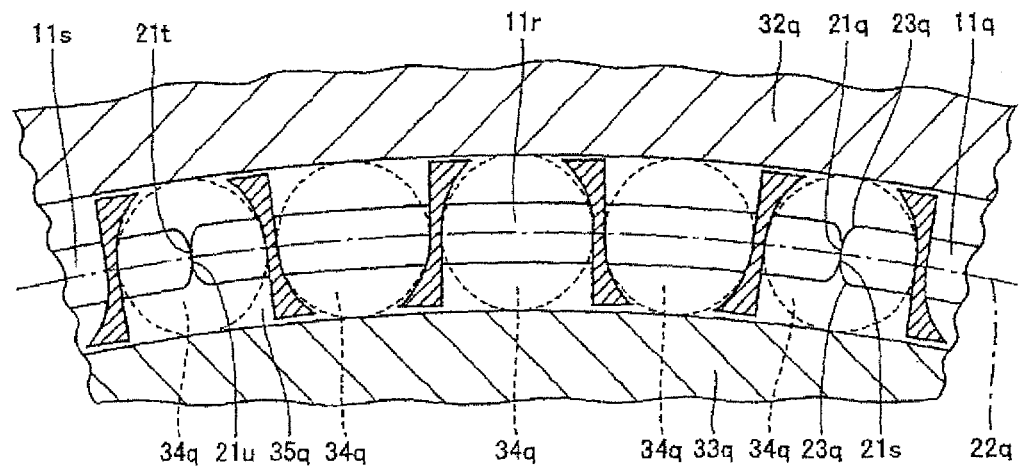
FIG. 30 is an enlarged sectional view showing the adjacent retainer segments.

Next, a description will be made of the constitution of the tapered roller bearing containing the retainer segment 11q and the spacer 26q. FIG. 29 is a schematic sectional view showing the tapered roller bearing 31q in which the plurality of retainer segments 11q, 11r, 11s and 11t and the spacer 26q are arranged in the circumferential direction, taken from the axial direction. In addition, FIG. 30 is an enlarged sectional view at a part XXX in FIG. 29. Here, since the retainer segments 11r, 11s and 11t have the same configuration as that of the retainer segment 11q, their description will be omitted. In addition, a tapered roller 34q held by the retainer segment 11q is not shown in FIG. 29. In addition, here, it is assumed that the retainer segment arranged first is the retainer segment 11q and the retainer segment arranged last is the retainer segment 11t among the plurality of retainer segments 11q to 11t.

Referring to FIGS. 29 and 30, a tapered roller bearing 31q comprises an outer ring 32q, an inner ring 33q, the plurality of retainer segments 11q to 11t, and the spacer 26q. The retainer segments 11q to 11t are continuously arranged in the circumferential direction. Here, the retainer segment 11q is arranged first, and then the retainer segment 11r is arranged so as to abut on the retainer segment 11q. Then, the retainer segment 11s is arranged so as to abut on the retainer segment 11r and the retainer segment is continuously arranged and finally the retainer segment 11t is arranged. Here, the tapered rollers 34q are arranged in pockets 35 formed between the two adjacent retainer segments 11q and 11r and the like except for the space between the first retainer segment 11q and the last retainer segment 11t.

The circumferential end face 21q of the retainer segment 11q abuts on an end face 21s of the adjacent retainer segment 11r. Here, even when the retainer segment 11q is inclined in the radial direction, for example, since the radial corner 23q of the end face 21q is chamfered, the end face 21s of the adjacent retainer segment 11r comes in contact with the chamfered part of the corner 23q. Thus, the end face 21s of the adjacent retainer segment 11r can be prevented from hitting against an edge. Therefore, when the retainer segment 11q comes in contact with the retainer segment 11r, contact surface pressure can be low, so that the friction and abrasion between the retainer segments 11q and 11r can be reduced.

In addition, similarly, even when the retainer segment 11q is inclined in the axial direction, that is, it is inclined in back-and-forth direction in FIG. 30, since the axial corner 28r of the end face 21q is chamfered, the end face 21s is prevented from hitting against an edge in this case also.

In addition, similarly, the end face 21r of the retainer segment 11q positioned on the large diameter side of the tapered roller 34q can be prevented from hitting against an edge when it is in contact with the adjacent retainer segment 11r.

In addition, similarly, when an end face 21t of the retainer segment 11r comes in contact with an end face 21u of the retainer segment 11s between the retainer segment 11r and the retainer segment 11s, even in the case where the retainer segment 11r is inclined, the end face 21u of the retainer segment 11s is prevented from hitting against an edge. Therefore, when the retainer segment 11r comes in contact with the retainer segment 11s, a contact surface pressure can be low, and the friction and abrasion can be reduced.

As described above, even when the retainer segments 11q to 11s are inclined among the adjacent retainer segments 11q, 11r and 11s, the end faces 21q to 21u of the retainer segments 11q to 11s can be prevented from hitting against the edges. Thus, the contact surface pressures between the retainer segments 11q to 11s can be lowered and the friction and abrasion can be reduced. As a result, the retainer segments 11q to 11s can be prevented from being damaged.

Furthermore, since the full crowning is provided in the end faces 21q and 21r in the radial and axial directions, the end face 21s of the adjacent retainer segment 11r abuts on the crowning part, so that the contact surface pressure can be further lowered, and the friction and the abrasion can be further reduced.

Figure 26B:
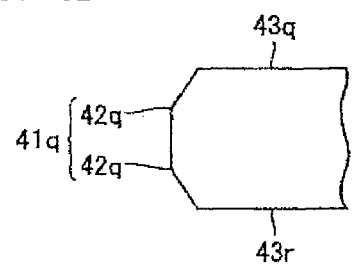
FIG. 26B is a view showing a circumferential end face of a retainer segment, taken from the axial direction, in which a cut crowning is provided.
Figure 26C:
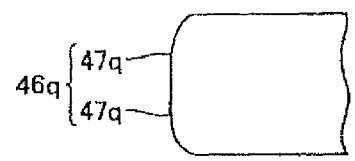
FIG. 26C is a view showing a circumferential end face of a retainer segment, taken from the axial direction, in which an R-chamfer is provided.

In addition, although the full crowning is provided in the end faces 21q and 21r in the above embodiment, the present invention is not limited to this. FIGS. 26B and 26C are views showing an end face 41q contained in the retainer segment 11q according to another embodiment of the present invention taken in the radial direction. In addition, FIGS. 27B and 27C are views showing the parts corresponding to FIGS. 26B and 26C, respectively, taken from the axial direction.

Figure 27B:
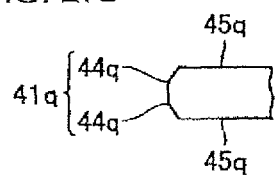
FIG. 27B is a view showing the circumferential end face of the retainer segment, taken from the radial direction, in which a cut crowning is provided.
Figure 27C:
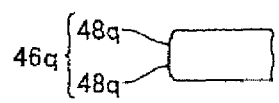
FIG. 27C is a view showing the circumferential end face of the retainer segment, taken from the radial direction, in which a R-chamfer is provided.

Referring to FIGS. 26B and 27B, the configuration of the end face 41q may be a cut crowning in which radial and axial corners 42q and 44q are cut at sharp angles with respect to an outer diameter surface 43q, an inner diameter surface 43r and an axial width surface 45q. Furthermore, referring to FIGS. 26C and 27C, the configuration of an end face 46q may be such that radial axial corners 47q and 48q may be R-chamfered. Furthermore, a partial crowning may be provided in the end faces 41q and 46q. Such end faces 41q and 46q have a configuration expanding from the corners 42q, 44q, 47q and 48q toward the center, so that the contact surface pressure can be lowered and the friction and the abrasion can be reduced when they are in contact with the adjacent retainer segment 11r.

Figure 31:
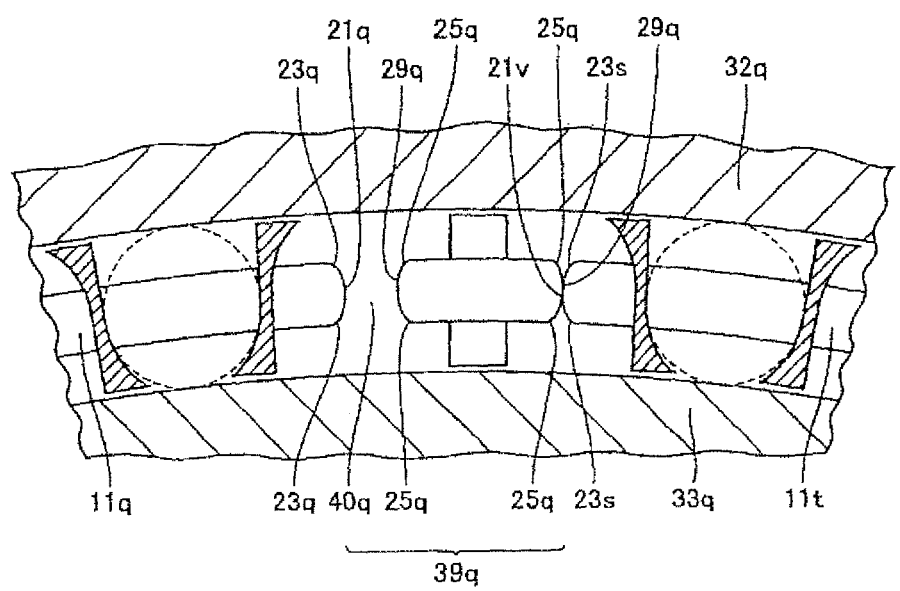
FIG. 31 is an enlarged sectional view in which the spacer is arranged between the first retainer segment and the last retainer segment.
Figure 32:
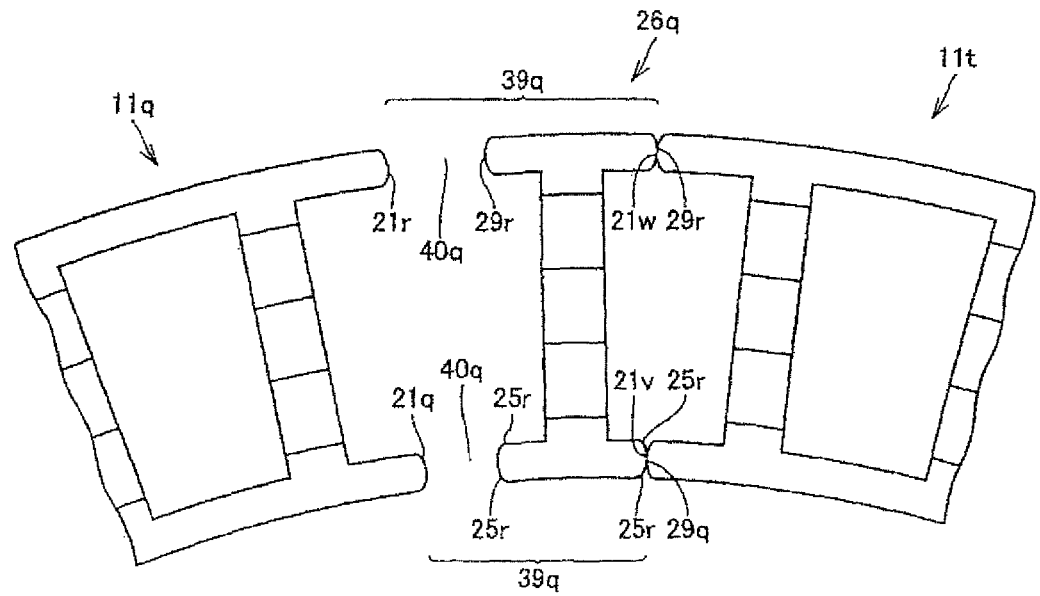
FIG. 32 is a schematic view showing the part shown in FIG. 31 taken from the radial outer side.

Next, a description will be made of the arranged state of the spacer 26q arranged between the first retainer segment 11q and the last retainer segment 11t. FIG. 31 is an enlarged sectional view showing a part XXXI in FIG. 29. In addition, FIG. 32 is a schematic view showing the part shown in FIG.

31 taken from the radial outer side, that is, from the side of the outer ring 32q. Referring to FIGS. 31 and 32, the retainer segments 11q and the like are continuously arranged so as to abut on each other, and the spacer 26q is arranged between a gap 39q between the retainer segment 11q and the retainer segment 11t. Thus, the dimension of a circumferential last gap 40q generated between the retainer segment 11q and the spacer 26q can fall within a set range easily. The last gap means a maximum gap between the first retainer segment 11q, and the spacer 26q arranged between the first retainer segment 11q and the last retainer segment 11t when the retainer segments 11q to 11t are arranged circumferentially without leaving any gap and the last retainer segment 11t and the spacer 26q are arranged without leaving any gap.

The circumferential spacer end face 29q of the spacer 26q abuts on the end faces 21q and 21v of the adjacent retainer segments 11q and 11t. Here, even when the spacer 26q is inclined in the radial direction, since the radial corner 25q of the spacer end face 29q is chamfered, the end faces 21q and 21v of the adjacent retainer segments 11q and 11t abut on the chamfered part of the corner 25q, edge hitting can be prevented. Thus, the contact surface pressure with the adjacent retainer segments 11q and 11t can be lowered, and the friction and abrasion with the retainer segments 11q and 11t can be reduced.

In addition, similarly, the spacer end face 29r positioned on the large diameter side of the tapered roller 34q can be prevented from hitting against an edge when it is in contact with the adjacent retainer segments 11q and 11t. Therefore, the contact surface pressure thereof can be lowered and the friction and abrasion thereof can be reduced. As a result, the adjacent retainer segments 11q and 11t can be prevented from being damaged.

Furthermore, since the corners 23q and 23s of the end faces 21q, 21r, 21v and 21w of the retainer segments 11q and 11t adjacent to the spacer 26q are also chamfered, even when the retainer segments 11q and 11t are inclined, the spacer end faces 29q and 29r can be prevented from hitting against an edge. Therefore, the contact surface pressure of the spacer 26q can be lowered and the friction and abrasion of the spacer 26q can be reduced. As a result, the spacer 26q can be prevented from being damaged.

In addition, even when the spacer 26q is inclined in the axial direction, that is, in the back-and-forth direction in FIG. 31, since the axial corners 25r of the spacer end faces 29q and 29r are chamfered, it can be prevented from hitting against an edge in this case also.

Furthermore, since the full crowning is provided in the spacer end faces 29q and 29r, the spacer 26q abuts on the adjacent retainer segments 11q and 11t at the part where the crowning is provided, so that the contact surface pressure can be further lowered, and the friction and the abrasion can be further reduced.

In addition, although each of the retainer segments 11q to 11t has the projections 16q and 16r projecting in the circumferential direction in the above embodiment, the present invention is not limited to this and may be applied to a retainer segment having no projection 16q or 16r, that is, having a constitution in which a column part is arranged on the circumferential outer side.

Figure 33A:
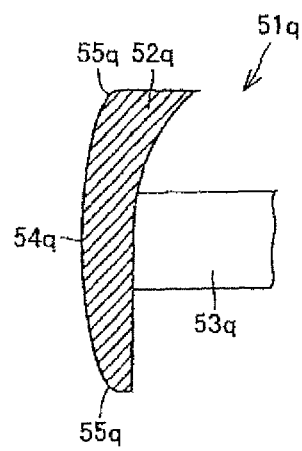
FIG. 33A is a sectional view showing a part of a retainer segment according to still another embodiment of the present invention, in which a column part comprises a full crowning at an end face.
Figure 33B:
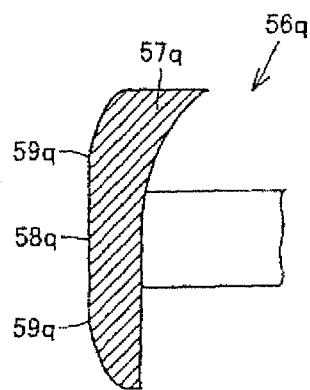
FIG. 33B is a sectional view showing a part of a retainer segment according to still another embodiment of the present invention, in which a column part comprises a cut crowning at an end face.

FIGS. 33A and 33B are sectional views showing a part of the retainer segment in this case. First, referring to FIG. 33A, a retainer segment 51q comprises a column part 52q positioned on the circumferential outer side, and a connection part 53q connecting the column part 52q. A corner 55q of a circumferential end face 54q of the column part 52q is chamfered. In addition, a full crowning is provided in the end face 54q such that it expands in the circumferential direction from the corners 55q of the end face 54q to the center. In this configuration, edge hitting can be prevented at the contact with the adjacent retainer segment. In addition, as shown in FIG. 33B, a corner 59q of an end face 58q of a column part 57q provided in a retainer segment 56q may be chamfered and a cut crowning cut at a sharp angle may be provided.

Figure 34:
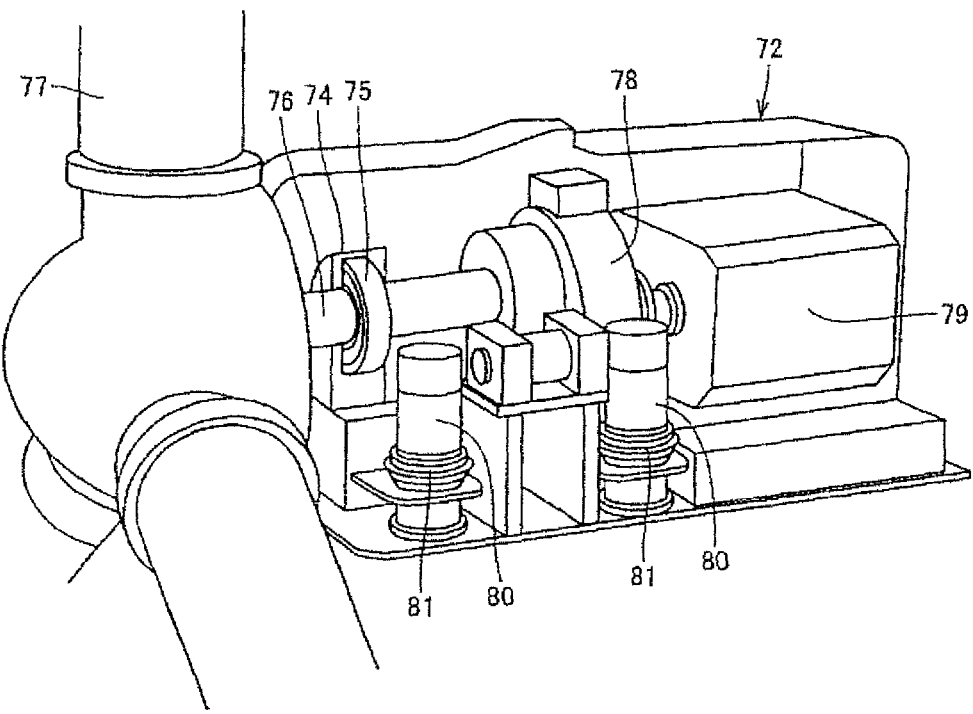
FIG. 34 is a view showing one example of a main shaft structure of a wind-power generator using the tapered roller bearing according to the present invention.
Figure 35:
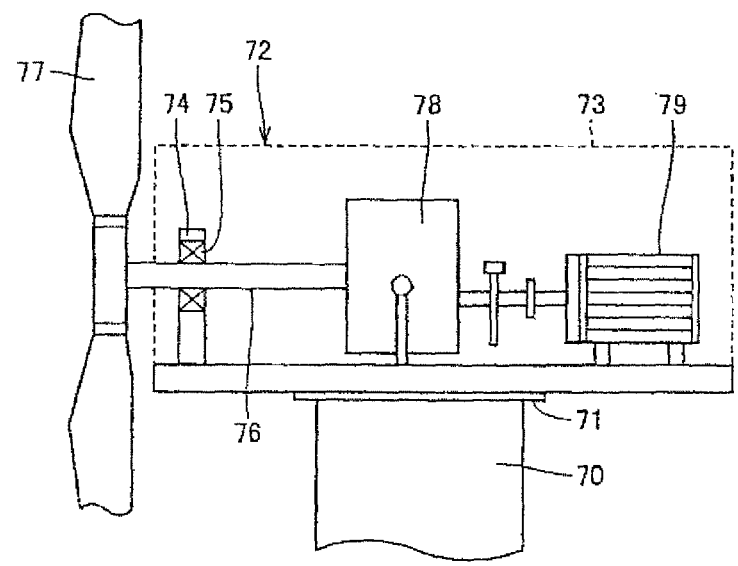
FIG. 35 is a schematic view showing the main shaft support structure of the wind-power generator shown in FIG. 34.
Figure 36:
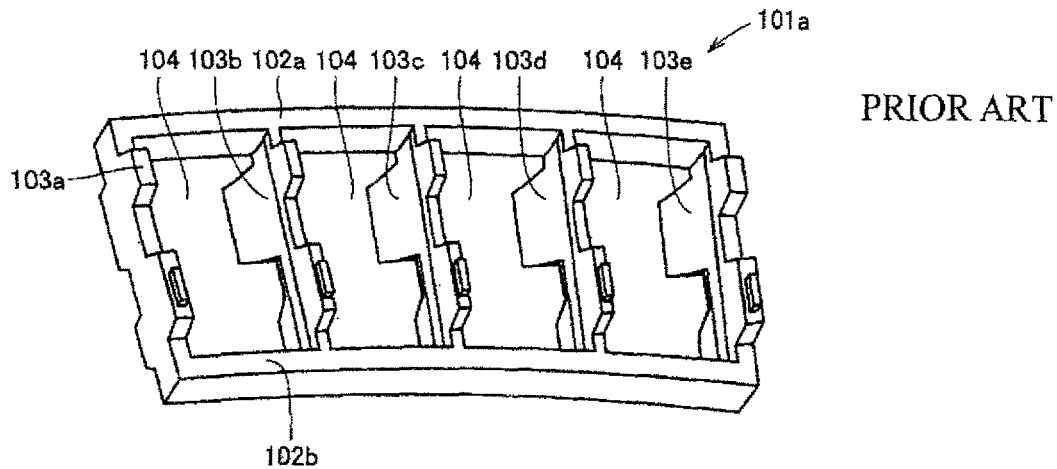
FIG. 36 is a perspective view showing a conventional retainer segment.
Figure 37:
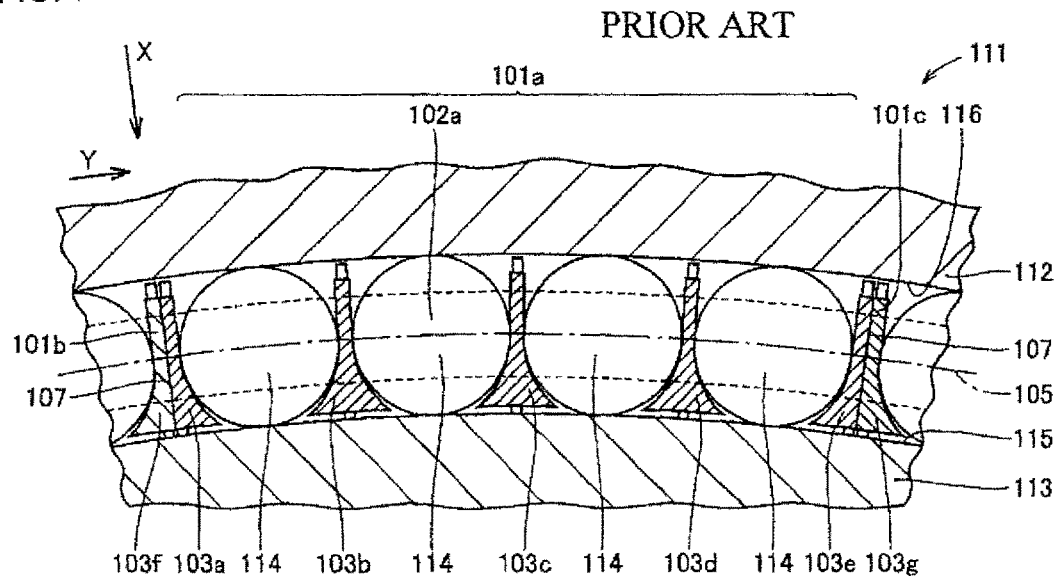
FIG. 37 is a sectional view showing the retainer segment shown in FIG. 36, cut by a plane containing a column part and intersecting with a shaft.
Figure 38:
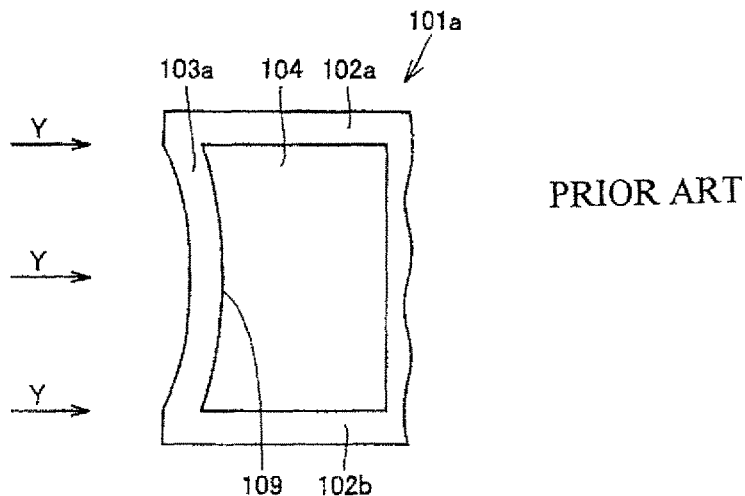
FIG. 38 is a view showing the conventional retainer segment taken from the radial outer side when a load is applied from an adjacent retainer segment in a circumferential direction.

FIGS. 34 and 35 show one example of a main shaft support structure of a wind-power generator in which the roller bearing according to one embodiment of the present invention is used as a main shaft support bearing 75. A casing 73 of a nacelle 72 for supporting the main part of the main shaft support structure is put on a support table 70 through a slewing bearing 71 at a high position so as to be horizontally turned. A blade 77 receiving wind power is fixed to one end of a main shaft 76. The main shaft 76 is rotatably supported in the casing 73 of the nacelle 72 through the main shaft support bearing 75 incorporated in a bearing housing 74, and the other end of the main shaft 76 is connected to a speed-up gear 78, and an output shaft of the speed-up gear 78 is coupled to a rotor shaft of a generator 79. The nacelle 72 is turned at any angle by a rotation motor 80 through a speed-down gear 81.

The main shaft support bearing 75 incorporated in the bearing housing 74 is the roller bearing according to one embodiment of the present invention comprising the outer ring, the inner ring, the plurality of rollers arranged between the outer ring and the inner ring, and the plurality of retainer segments having the plurality of column parts extending in a direction along the shaft so as to form a pocket for holding the roller, and the plurality of connection parts extending in the circumferential direction so as to connect the plurality of column parts, and continuously lined with each other in the circumferential direction between the outer ring and the inner ring. The column part is positioned at circumferential each end of the retainer segment. Here, the circumferential outer side end face of the column part positioned at each end is flat, and the circumferential inner side end face of the column part positioned at the end is provided with the recess recessed in the circumferential direction so as to reduce the thickness of the column part.

Since the main shaft support bearing 75 supports the main shaft 76 whose one end is fixed to the blade 77 receiving great wind power, it receives a high load. Here, according to the above constitution, even when a circumferential high load is applied from the adjacent retainer segment to the retainer segment in the roller bearing, the roller can be prevented from being locked and the column part can be prevented from being damaged. Thus, the roller bearing has a long life and the main shaft support structure of the wind-power generator implements long life.

The main shaft support bearing 75 incorporated in the bearing housing 74 is the roller bearing according to still another embodiment of the present invention comprising the outer ring, the inner ring, the plurality of rollers arranged between the outer ring and the inner ring, and the plurality of retainer segments having the plurality of column parts extending in the direction along the shaft so as to form the pocket for holding the roller and the plurality of connection parts extending in the circumferential direction so as to connect the plurality of column parts and continuously lined with each other in the circumferential direction between the outer ring and the inner ring. The column part is positioned at circumferential each end of the retainer segment. Here, the expansion part expanding in the circumferential direction is provided on the circumferential outer side of the column part positioned at the end, and the recess recessed in the circumferential direction so as to reduce the thickness of the column part is provided on the circumferential inner side thereof.

Since the main shaft support bearing 75 supports the main shaft 76 whose one end is fixed to the blade 77 receiving great wind power, it receives a high load. Here, according to the above constitution, even when a circumferential high load is applied from the adjacent retainer segment to the retainer segment in the roller bearing, the retainer segment can be prevented from being damaged. Thus, the roller bearing has a long life and the main shaft support structure of the wind-power generator implements long life.

The main shaft support bearing 75 incorporated in the bearing housing 74 is the roller bearing according to still another embodiment of the present invention, and the roller bearing comprises the outer ring, the inner ring, the plurality of rollers arranged between the outer ring and the inner ring, and the plurality of retainer segments having the plurality of column parts extending in the direction along the shaft so as to form the pocket for holding the roller and the plurality of connection parts extending in the circumferential direction so as to connect the plurality of column parts and continuously lined with each other in the circumferential direction between the outer ring and the inner ring, in which the corner of the circumferential end face is chamfered.

Since the main shaft support bearing 75 supports the main shaft 76 whose one end is fixed to the blade 77 receiving great wind power, it receives a high load. Thus, the main shaft support bearing 75 has to be large itself. Here, when the retainer segment is provided by dividing the one annular retainer to improve the productivity, since each retainer segment is an independent member, it is likely that the retainer segment is inclined and it is in contact with the adjacent retainer segment at their edges. Thus, according to the above constitution, even when the retainer segment is inclined, since it is in contact with the chamfered part, edge hitting can be prevented. Therefore, the retainer segment is prevented from being damaged, and the main shaft support structure of the wind-power generator implements a long life.

In addition, although the retainer segment has three pocket for holding the rollers in the above embodiment, the present invention is not limited to this and a retainer segment may have four or more pockets. According to such retainer segment, since it has many pockets provided with the guide surface, it can be arranged in the radial direction more stably.

In addition, although the tapered roller is used as the roller provided in the roller bearing in the above embodiment, the present invention is not limited to this, a cylindrical roller, a needle roller, and a long roller may be used.

In addition, although the circumferential and axial corners of the end face of the retainer segment are chamfered in the above embodiment, the present invention is not limited to this, and any one of the corners may be chamfered.

Furthermore, although the tapered roller bearing comprises the spacer in the above embodiment, the present invention is not limited to this and it can be applied to a tapered roller bearing having no spacer. In addition, the configuration of the spacer may be a roughly rectangular solid or a configuration in which the center is expanded in the circumferential direction. Furthermore, the roller may not be arranged between the adjacent retainer segments, or the roller may be arranged between the spacer and the retainer segment.

Although the embodiments of the present invention have been described with reference to the drawings in the above, the present invention is not limited to the above-illustrated embodiments. Various kinds of modifications and variations may be added to the illustrated embodiments within the same or equal scope of the present invention.

INDUSTRIAL APPLICABILITY

According to the roller bearing and the retainer segment in the present invention, since the roller can be prevented from being locked and the column part can be prevented from being damaged, they can be effectively applied to a roller bearing in which smooth roller rolling is required.

In addition, according to the roller bearing, the retainer segment and the spacer in the present invention, since the retainer segment can be prevented from being damaged, they can be effectively applied to a roller bearing in which a long life is required and a retainer segment and a spacer used in such roller bearing.

In addition, according to the main shaft support structure of the wind-power generator in the present invention, it can be effectively applied to a main shaft support structure of a wind-power generator in which a long life is required.

The invention claimed is:

1. A roller bearing comprising:
    an outer ring;
    an inner ring;
    a plurality of rollers arranged between said outer ring and said inner ring; and
    a plurality of retainer segments having a plurality of column parts extending in a direction along a shaft so as to form a pocket for holding said roller, and a connection part extending in a circumferential direction so as to connect the plurality of column parts, and continuously lined with each other in the circumferential direction between said outer ring and said inner ring, in which a corner of a circumferential end face of each retainer segment is chamfered; and
    a spacer arranged between a circumferentially arranged first retainer segment and last retainer segment, the spacer having a circumferential spacer end face, the circumferential spacer end face having a chamfered part at a corner thereof.

2. The roller bearing according to claim 1, wherein said chamfered part is provided at a radial corner of each said circumferential end face.

3. The roller bearing according to claim 1, wherein each said circumferential end face expands in the circumferential direction from corners thereof to a center thereof.

4. The roller bearing according to claim 1, wherein each said circumferential end face is provided with a crowning.

5. A spacer arranged between a circumferentially arranged first retainer segment and last retainer segment, the spacer having a circumferential spacer end face, the circumferential spacer end face having a chamfered part at a corner thereof.

6. A main shaft support structure of a wind-power generator, comprising:
    a blade receiving wind power;
    a main shaft having one end fixed to said blade and rotating together with the blade; and
    a roller bearing incorporated in a fixing member and supporting said main shaft rotatably, wherein
    said roller bearing comprises:
        an outer ring;
        an inner ring;
        a plurality of rollers arranged between said outer ring and said inner ring;

a plurality of retainer segments having a plurality of column parts extending in a direction along the shaft so as to form a pocket for holding said roller, and a connection part extending in a circumferential direction so as to connect the plurality of column parts, and continuously lined with each other in the circumferential direction between said outer ring and said inner ring, in which a chamfered part is provided at a corner of a circumferential end face of each retainer segment; and a spacer arranged between a circumferentially arranged first retainer segment and last retainer segment, the spacer having a circumferential spacer end face, the circumferential spacer end face having a chamfered part at a corner thereof.

* * * * *